US008296120B2

(12) United States Patent
Phillips et al.

(10) Patent No.: US 8,296,120 B2
(45) Date of Patent: Oct. 23, 2012

(54) FPGA SIMULATED ANNEALING ACCELERATOR

(75) Inventors: Jonathan D. Phillips, Logan, UT (US); Aravind Dasu, Providence, UT (US)

(73) Assignee: Utah State University, Logan, UT (US)

(*) Notice: Subject to any disclaimer, the term of this patent is extended or adjusted under 35 U.S.C. 154(b) by 673 days.

(21) Appl. No.: 12/489,260

(22) Filed: Jun. 22, 2009

(65) Prior Publication Data
US 2009/0319253 A1 Dec. 24, 2009

Related U.S. Application Data

(60) Provisional application No. 61/074,225, filed on Jun. 20, 2008, provisional application No. 61/074,228, filed on Jun. 20, 2008, provisional application No. 61/155,637, filed on Feb. 26, 2009.

(51) Int. Cl.
*G06F 17/50* (2006.01)
*G06F 9/455* (2006.01)
*G06G 7/48* (2006.01)

(52) U.S. Cl. ....... 703/16; 703/2; 703/4; 703/6; 716/113; 716/121; 716/122; 716/123

(58) Field of Classification Search ............ 703/16, 703/2, 4, 6; 716/113, 121, 122, 123
See application file for complete search history.

(56) References Cited

U.S. PATENT DOCUMENTS

| 5,557,533 | A * | 9/1996 | Koford et al. ............ 716/123 |
| 5,745,735 | A * | 4/1998 | Cohn et al. ............... 703/6 |
| 6,360,191 | B1 * | 3/2002 | Koza et al. ............... 703/6 |
| 6,651,233 | B2 * | 11/2003 | Teig et al. ............... 716/123 |
| 6,725,437 | B1 * | 4/2004 | Rao et al. ............... 716/123 |
| 6,826,737 | B2 * | 11/2004 | Teig et al. ............... 716/124 |
| 6,848,091 | B2 * | 1/2005 | Teig et al. ............... 716/123 |
| 7,194,721 | B1 * | 3/2007 | Slonim et al. ............ 716/113 |
| 7,194,722 | B1 * | 3/2007 | Abid et al. .............. 716/121 |
| 8,117,288 | B2 * | 2/2012 | Bhanot et al. ............ 709/220 |
| 2006/0101104 | A1 * | 5/2006 | Bhanot et al. ............ 708/105 |
| 2007/0150846 | A1 * | 6/2007 | Furnish et al. ............ 716/8 |
| 2007/0204252 | A1 * | 8/2007 | Furnish et al. ............ 716/10 |
| 2007/0220522 | A1 * | 9/2007 | Coene et al. ............. 718/104 |
| 2008/0008972 | A1 * | 1/2008 | Muelders et al. ......... 430/346 |

OTHER PUBLICATIONS

Wrighton et al. "Hardware Assisted Simulated Annealing with Application for Fast FPGA Placement", ACM 2003.*
Chu et al. "Parallel Simulated Annealing by Mixing of States", Journal of Computational Physics 148, 646-662 (1999).*
Lukowiak et al. "FPGA Based Accelerator for Simulated Annealing With Greedy Perturbations", Jun. 2007.*
Fanning, M. "Parallel Simulated Annealing Applied to RNAi Inexact Match Gene Family Knockdown", 2007.*
Mishra et al. "Rapid Exploration of Pipelined Processors through Automatic Generation of Synthesizable RTL Models", Proceedings of the 14th IEEE International Workshop on Rapid Systems Prototyping (RSP'03).*
Diekmann et al. "Problem Independent Distributed Simulated Annealing and its Applications", 1993.*

(Continued)

*Primary Examiner* — Shambhavi Patel

(57) ABSTRACT

Iterative repair problems are generally solved using a combinatorial search method such as simulated annealing are addressed with a FPGA-based coarse-grain pipelined architecture to accelerate a simulated annealing based iterative repair-type event scheduling application. Over 99% of the work done by any simulated annealing algorithm is the repeated execution of three high-level steps: (1) generating, (2) evaluating, and (3) determining the acceptability of a new problem solution. A pipelined processor is designed to take advantage of these steps.

10 Claims, 19 Drawing Sheets

OTHER PUBLICATIONS

Betz et al. "Architecture and CAD for Deep Submicron FPGAs", 1999.*

P. Banerjee et al. "Accelerators for fpga placement," in The 4th Annual Inter Research Institute Student Seminar in Computer Science, Apr. 2005.*

Chen et al. "FPGA Design Automation: A Survey", Foundations and Trends in Electronic Design Automation vol. 1, No. 3 (Nov. 2006) 195-330.*

Sankar, Yaska. "Ultra-Fast Automatic Placement for FPGAs", 1999.*

Haldar, et al. "Parallel Algorithms for FPGA Placement", 2007.*

* cited by examiner

```
temperature ← INITIAL_TEMP
generate initial solution
compute score of initial solution
while temperature > STOP_THRESHOLD
      copy: next_solution ← current_solution
      alter: modify next_solution
      evaluate: compute score of next_solution
      accept: probabilistically accept next_solution
      adjustTemperature
```

Fig. 1

```
                    Initialize Solution and Variables <num_events, max_num_control_steps,
                        curConflicts, curSolution, e_matrix, max_resources_available,
                        resource_used, num_edges, temperature, cutoff_Temperature>
                    while (temperature > cutoff_Temperature)
     Copy Stage {        for (i 0 to NUM_EVENTS)
                             altSolution[i] = curSolution[i];
                        nodeToAlter = RandomInteger(0 to NUM_EVENTS);
     Alter Stage {      newControlStep = RandomInteger(0 to MAX_NUM_CONTROL_STEPS);
                        altSolution[nodeToAlter] = newControlStep;
                        altConflicts = 0;
                        for (i 0 to NUM_EDGES)
  Evaluate Stage:           srcNode = e_matrix[i][0];
Dependency Graph {          dstNode = e_matrix[i][1];
      Violations            if ((altSolution[dstNode] <= altSolution[srcNode])
                                altConflicts += altSolution[srcNode] - altSolution[dstNode];
                        Clear control step matrix (cs_matrix)
                        for (i 0 to NUM_EVENTS)
  Evaluate Stage:           cs_matrix[altSolution[i]][resource_used[i]]++;
  Resource Over- {      for (i 0 to MAX_NUM_CONTROL_STEPS)
      utilization           for (j 0 to MAX_RESOURCE_TYPES)
                                if (cs_matrix[i][j] > max_resources_available[j])
                                    altConflicts += (cs_matrix[i][j] - max_resources_available[j]);
                        start = MAX_NUM_CONTROL_STEPS;
                        stop = 0;
                        for (i 0 to NUM_EVENTS)
  Evaluate Stage:           if (altSolution[i] < start)
  Total Schedule {              start = altSolution[i];
        Length              if (altSolution[i] > stop)
                                stop = altSolution[i];
                        altConflicts += stop - start;
                        p = exp((curConflicts - altConflicts)/temperature);
                        if ((altConflicts <= curConflicts) || (RandomFloat(0 to 1.0) < p))
   Accept Stage {           for (i 0 to NUM_EVENTS)
                                curSolution[i] = altSolution[i];
                            curConflicts = altConflicts;
Adjust Temp. Stage {    temperature = temperature * COOLING_RATE;
                    Check if Solution is Acceptable
```

Figure 16

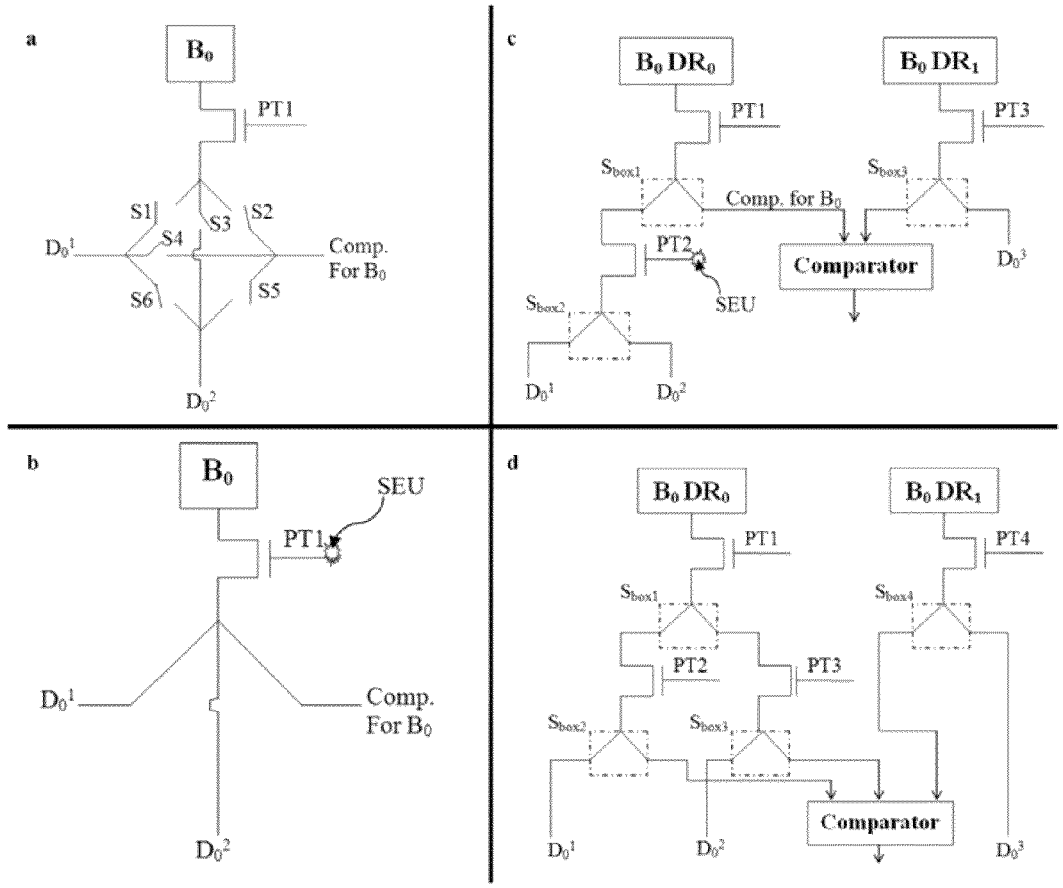

Figure 22

```
generate minimal architecture for all stages
compute latency of all stages
Loop
      identify worst-performing stage
      reduce latency of worst stage by either
            a.   reducing latency enough to pass "worst
                 stage" label to a different stage OR
            b.   reducing latency as much as possible
                 while retaining "worst stage" label
EndLoop (when worst stage label cannot be passed)
```

Figure 23

FPGA SIMULATED ANNEALING ACCELERATOR

RELATED APPLICATIONS

This application claims priority to U.S. Provisional Application No. 61/074,225 filed on. Jun. 20, 2008, entitled "Architecture Template for Simulated Annealing Processor Derivation" and is incorporated herein by reference and claims priority to U.S. Provisional Application No. 61/155,637 filed on Feb. 26, 2009, entitled "FPGA Simulated Annealing Accelerator" and is incorporated herein by reference, and claims priority to U.S. Provisional Application No. 61/074,228 filed on Jun. 20, 2008, entitled "Method for Deriving an Efficient, Application-Specific, FPGA-Based Pipelines Processor", and is incorporated herein by reference.

TECHNICAL FIELD

The present invention relates to methods and devices for controlling simulated annealing coding on field programmable gate arrays.

BACKGROUND

Microprocessors such as the PowerPC and x86 line have been the traditional work-horses of computing systems over the years. While they offer post-fabrication flexibility through software programmability, the demand for on-board autonomy-enabling applications has pushed the envelope of computation, complexity far beyond the reach of these processors. Application specific integrated circuits (ASICs), while being capable of meeting the computation demands of these algorithms, incur very high NRE (non-recurring engineering) costs and offer little to no flexibility for algorithmic changes in the post-deployment/fabrication phase. Field Programmable Gate Arrays (FPGAs) are gaining increasingly strong support in the computing community as the platform of choice for applications because they offer the best of both ASIC and microprocessor worlds. Today's state-of-the-art SRAM FPGAs have low cost, high capability and nearly-zero NRE. FPGA-based designs can be deployed as-is or converted to a low-cost structured ASIC.

In this disclosure, a novel FPGA-based architecture which performs iterative repair scheduling is presented. An overview of current designs and methodologies for supporting iterative repair, simulated annealing, and application-specific processors is presented. Details of the four-stage pipelined architecture are disclosed, followed by results and analysis that compares this new architecture with existing methods.

The design of an iterative repair processor leverages concepts from several different areas, including the development of the iterative repair algorithm itself development of heuristic search techniques, and application-specific hardware implementations of these techniques.

SUMMARY OF THE INVENTION

Iterative repair is a widely-used method for deriving solutions for complex combinatorial problems. It involves the modification (or repair) of an initial solution repeatedly over thousands of iterations to arrive at an optimal solution. The topic of focus in this disclosure relates to employing iterative repair to solve a broad class of complex problems. As an example problem from the greater class a scheduling problem for a space based mission is discussed. In the example scheduling problem, a typical solution would consist of a list of start times for all events. These start times are then modified to resolve scheduling conflicts and remove unnecessary delays.

ASPEN are tools that were developed at the Jet Propulsion Lab for use in modeling and implementing space-based mission planning and scheduling algorithms. ASPEN consists of a GUI-based design environment that supports a C-like programming language for modeling events that must be scheduled. CASPER is a stripped-down version of ASPEN that was designed to fly on the satellite, performing dynamic planning and continuous rescheduling of mission-critical events in real time. CASPER continuously runs an iterative repair algorithm to constantly improve and update the schedule.

Iterative repair is an example of a simulated annealing algorithm. Simulated annealing is a hill-climbing algorithm employed to alleviate entrapment in local minima as better solutions are sought in the search space. FIG. 1 shows pseudocode for the simulated annealing algorithm. An initial solution is generated, usually randomly, and evaluated. This initial solution is designated as the current solution until a new one is accepted. The main loop is now entered, which generally loops several thousand times. On each iteration, the current solution is copied verbatim to a second butler, where it is designated as the next solution. This next solution is then altered slightly and evaluated. The score of this new solution is then compared against the score of the current solution. The crux of the algorithm is determining whether to accept the next solution as the new current solution or discard it in favor of the keeping the resident current solution. This decision is made according to (1).

$$p = e^{\Delta E/T}, \Delta E = S_{next} - S_{current} \quad (1)$$

In this equation, Snext and Scurrent are the scores of the current and next solutions, respectively, and T represents temperature. The probability p is a function of both the temperature and the difference between the score of the current solution and the score of the new solution (ΔE). A random number is generated and compared top to determine whether a solution should be accepted. When the temperature is high, suboptimal solutions are more likely to be accepted. This feature allows the algorithm to escape from local minima as it searches the solution space and zero in on the true optimal solution. The last step in the loop decreases the temperature according to a pre-determined schedule. A typical method is to geometrically decrease the temperature by multiplication by a cooling rate, which is generally a number such as 0.99 or 0.999. The closer the cooling rate is to 1.0, the more times the loop will execute. This results in longer program execution, but also improves the probability of finding the best solution. Cooling too fast reintroduces the local-optima entrapment problem to the system.

FIG. 2 shows how simulated annealing can be applied to an iterative repair problem, in this case, a simple example consisting of ten events is presented. These events are numbered 0 through 9, and can be treated as indices to a solution array in computer memory. At any point in time, two solutions are maintained: the current solution and the potential next solution. From FIG. 1, the first step in the loop is to copy the current solution into the next solution buffer. Once this is done, the next solution must be altered in some way. FIG. 2 depicts a simple value swap, where two events are selected at random and the respective start times are swapped. This new solution must then be evaluated to determine how it compares with the current solution. Factors to take into consideration when computing the value of a schedule could include effective resource utilization, dependency graph violations (when a child event is scheduled before a parent event), and overall length of the schedule. Once the new schedule's value has been determined, equation (1) is applied to determine whether or not it should replace the current solution. If the next score is better than the current score, it replaces the current score unconditionally. If it is worse, it is accepted with the computed probability, depending on both the score of the solution and the temperature. The temperature is then updated as described previously. This process is repeated until the temperature falls below a predetermined threshold, at which time the best schedule found is returned by the system.

DESCRIPTION OF THE FIGURES

FIG. 1. Simulated annealing pseudocode. An optimal solution is derived by repeatedly executing the five steps.

FIG. 16: Pseudo-code of the Simulated Annealing Kernel

FIG. 22: Switch box connections

FIG. 23: Algorithm for generating a pipelined processor.

DETAILED DESCRIPTION OF THE INVENTION

Figure 2:
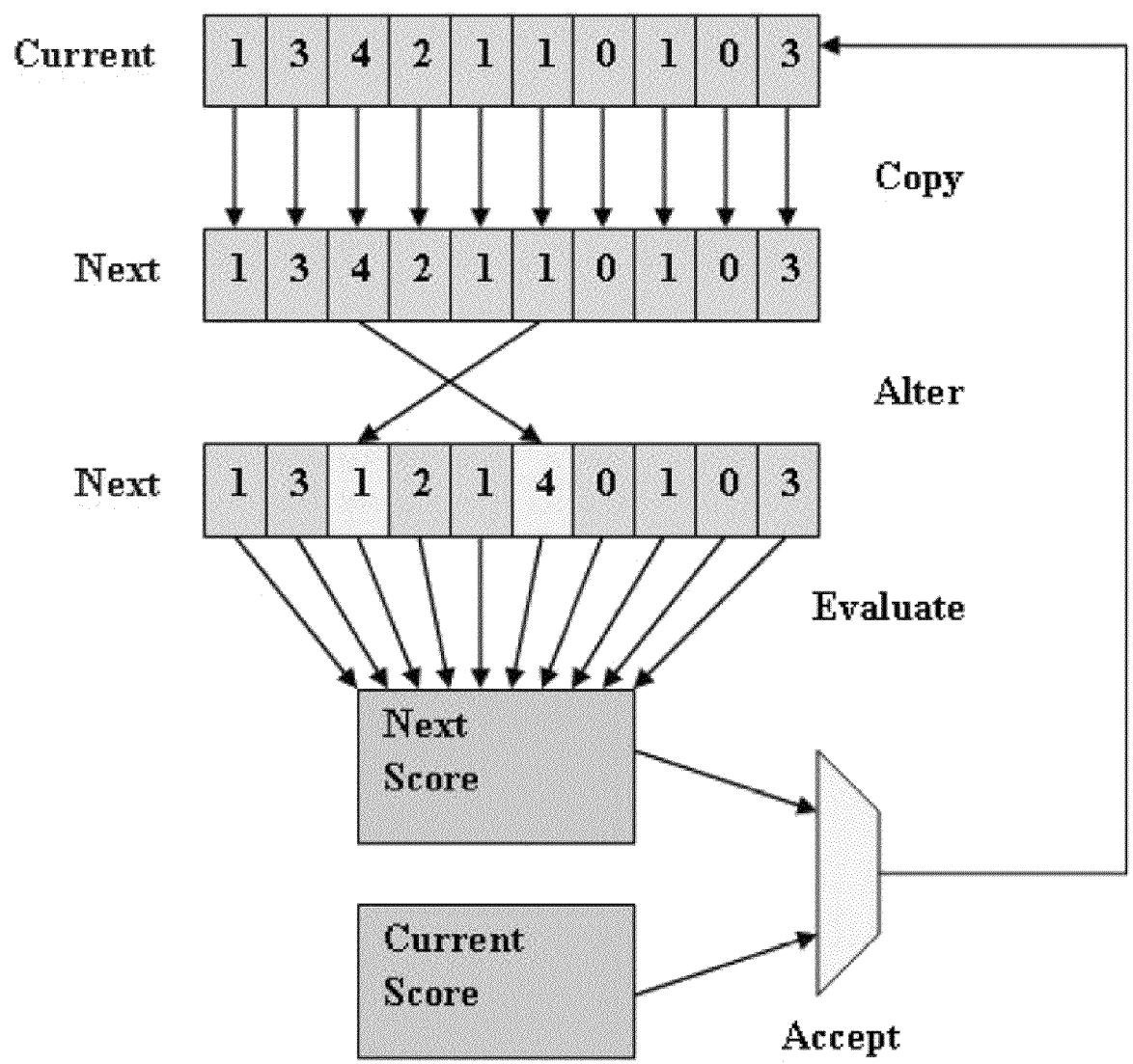
FIG. 2. Iterative repair using simulated annealing. A solution is copied, altered, evaluated, compared against the current solution, and accepted conditionally. This process is repeated thousands of times to arrive at the optimal solution.
Figure 3:
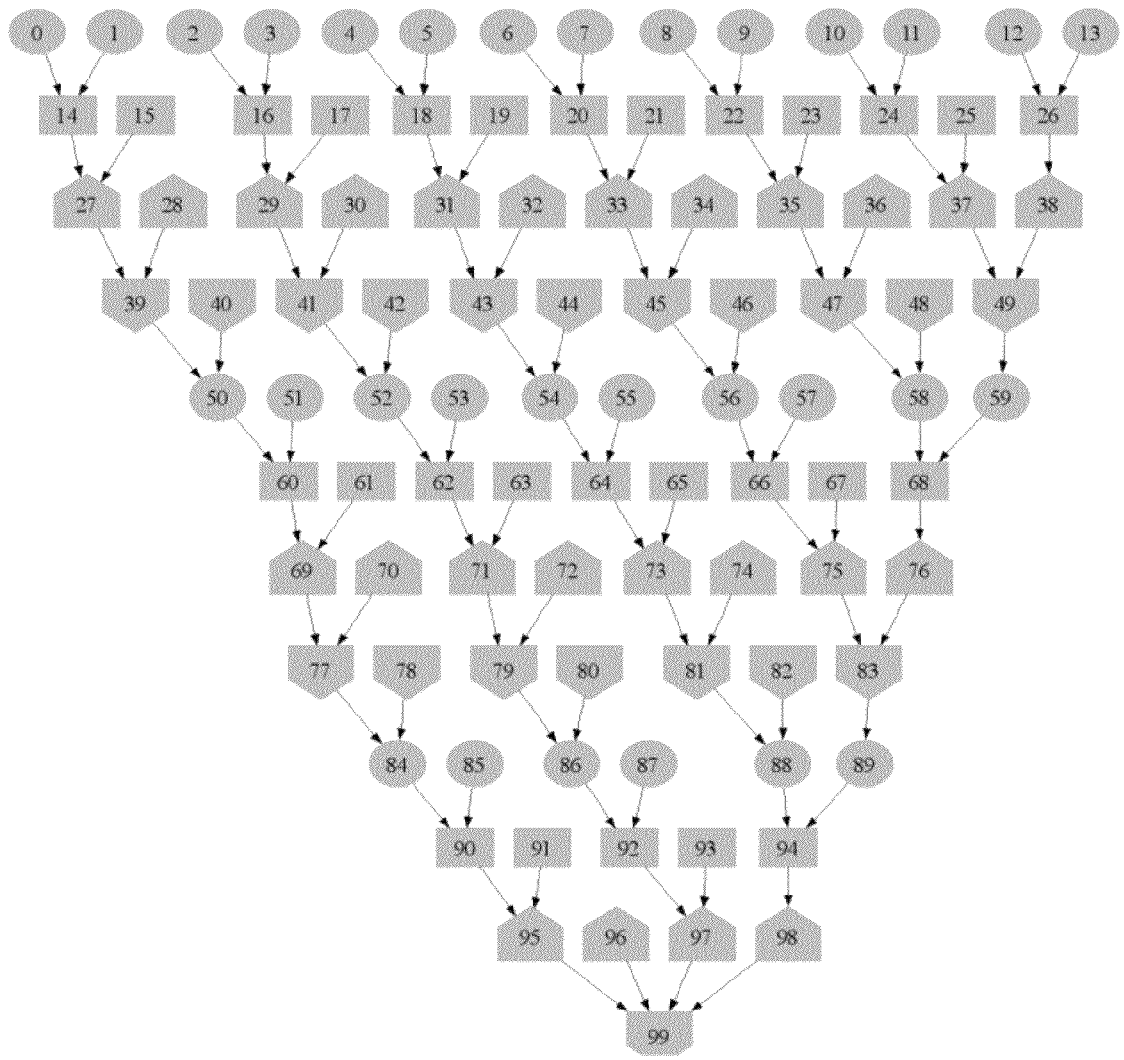
FIG. 3. Event dependency graph of 100 events. Events are represented by the numbered nodes. Edges indicate dependencies. Each event also uses one of four resource types, designated by the shape of the node.

We disclose a unique hardware architecture, derived from an ANSI C implementation of iterative repair using simulated annealing. In this implementation for the working example, a solution is represented as a string of start times for events numbered 0 to 99 for a problem consisting of 100 events that need to be scheduled. Events have dependencies, meaning that certain events must complete before others can start. FIG. 3 depicts this event dependency graph. Each event utilizes one unit of one of four types of resources. There are four resources of each type.

The resource type associated with each event is designated by the shape of the event node in FIG. 3. Each event, takes one time step to complete. Additional input parameters are a maximum schedule length of 32 time steps, an initial temperature of 10,000, a cooling rate of 0.9999, and a termination threshold of 0.0001. This means that the schedule cannot exceed 32 time steps, the simulated annealing temperature starts at 10,000 and is decreased geometrically by 0.9999 on each iteration, and the program terminates when the temperature falls below 0.0001. This means that the loop runs 184,198 times. For this design, 16-bit integer arithmetic and 32-bit floating-point arithmetic were assumed.

Figure 4:
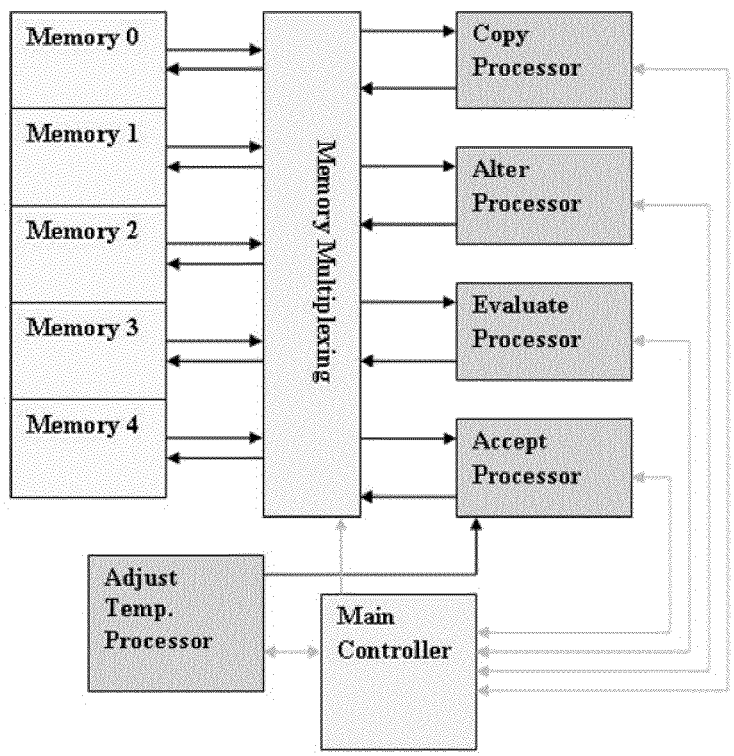
FIG. 4. Iterative repair architecture. A pipelined processor with associated memory constructs is derived from the simulated annealing pseudocode.

Based upon the pseudocode described In above, an application-specific architecture was developed to exploit the characteristics of the algorithm. The architecture is composed of a four-stage pipeline coupled with five memory banks. Each stage in the pipeline corresponds to a step in the simulated annealing pseudocode—copy, alter, evaluate, and accept. A global controller coordinates execution and data exchange between the units. An interface between memory banks and processors is provided. An Adjust Temperature Processor controls the cooling process. As this is a pipelined architecture, it can only operate as fast as the slowest stage. Careful design techniques must be employed in the more complex stages to minimize the latency. A block-level diagram of this architecture is shown in FIG. 4. Bach of these stages is discussed in detail in this disclosure.

Memory Design

The architecture consists of five memory banks, numbered zero through four in FIG. 4, derived from Xilinx FPGA block RAMs. Each memory bank needs one write port and four read ports, all 16 bits wide. Four read ports are needed to facilitate parallelism in the Evaluate Stage. Because a Xilinx block RAM allows for one read and one write port, four block RAMs are used in the instantiation of each 128-word (16-bit word) memory bank. Each memory bank holds a solution and the score of the solution. The memory contents are detailed in FIG. 5. At any given point in execution time, one memory bank is associated with each of the four processing stages in the pipeline. The remaining memory block holds the current solution. The main controller determines how memory blocks are associated with different processing stages. Because the location of data in the memory is known at design time, many cycles are saved during execution by avoiding address computations.

Copy Processor

As shown in FIG. 1, the main loop of the simulated annealing algorithm begins by making a copy of the current solution. This copy is then altered to generate a new solution that could potentially replace the current solution. In the architecture shown in FIG. 3, the Copy Processor performs this copying function. The C code for performing the copy function is shown here:

```
for (i=0; i<MAX_EVENTS; i++)
    dest[i] = source[i];
```

Figure 5:
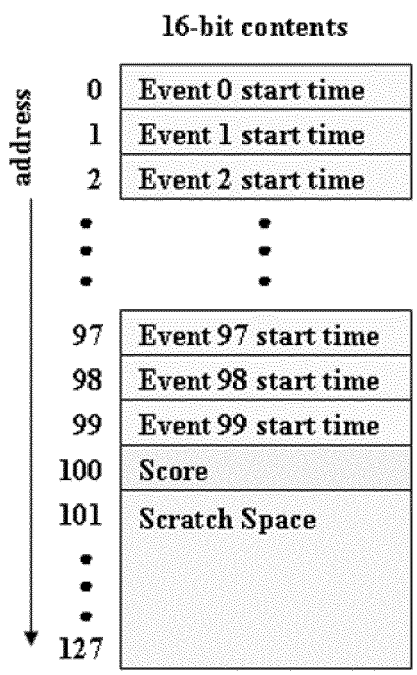
FIG. 5. Memory contents. Each of the live memory modules is configured identically.

Since the length of the solution is known, the contents of the solution in the "current solution" memory bank are copied, word by word, into the memory bank currently associated with the Copy Processor. There is no need to accelerate the copy process through parallelism, as this pipeline stage is guaranteed to complete in n+1 clock cycles for a solution length of n. Other stages are much more compute-intensive. The copy processor is simply a controller to facilitate data transfers. A "step" signal comes from the main controller, indicating that a new pipeline step has begun. The copy controller consists of a counter that generates addresses and produces a "done" signal when all data has been copied and also controls the write-enable line on the destination memory bank. The source and destination addresses are identical, because the data, locations in each memory bank are identical, as shown in FIG. 5.

Alter Processor

The second stage in the iterative repair pipeline is the Alter Processor. One event is selected at random from the solution string. The start time of this event is changed to a random time that falls between zero and the maximum latency. The C code for this function is as follows:

```
i = rand( ) % MAX_EVENTS;
j = rand( ) % MAX_LATENCY;
sched[i] = j;
```

Figure 6:
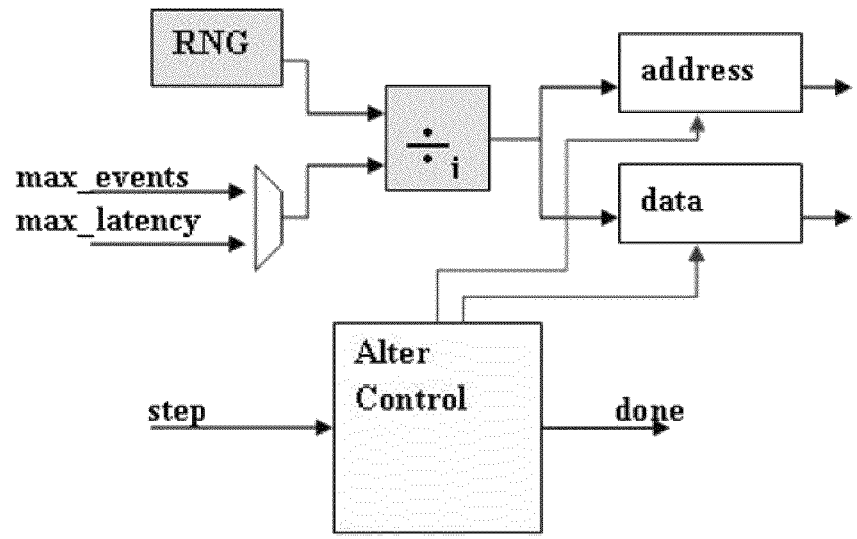
FIG. 6. The Alter Processor. A random number generator is used to select and modify the start time of one event.

The hardware implementation of this stage, shown in FIG. 6, could be accelerated by introducing an additional random number generator and an additional divider, allowing for maximum concurrency. This additional hardware is not necessary however, as a 19-cycle integer divider allows this stage to terminate in 21 clock cycles, regardless of the size of the solution string. As solutions generally consist of hundreds of events, even the simple Copy Processor will have a greater latency than the Alter Processor. The alter controller is based on a counter that starts when the "step" signal is received from the Main Controller, control logic to enable register writing on the "address" and "data" registers on the proper clock cycles, and a "done" signal.

The random number generators (RNG) used in both the Alter Processor and the Accept Processor are 15-bit linear feedback shift registers (LFSRs) which generate a new integer between zero and 32,767 on every clock cycle. The incoming bit of the shift register (bit 0) is derived by passing bits 14 and 13 through an exclusive- or gate and inverting the result.

Some improvements could be made to the alter processor to further enhance performance in both time and resource utilization. For example, if "MAX_LATENCY" and "MAX_EVENTS" were constrained to be powers of two, the integer divider in FIG. 6 could be replaced with a simple shift register. The feasibility of constraining "MAX_EVENTS" to be a power of two, however, is low for most scheduling problems, as the number of events is rarely if ever a perfect power of two. Leaving the divider unit allows the architecture to handle problems of varying sizes.

Acceleration of Compute-Intensive Stages

Other stages, such as Alter and Evaluate in this example, are compute-intensive and are excellent candidates for extracting parallelism. For example, C code for the Evaluate stage is as follows:

```
distance = 0;
for (i=0; i<99; i++)
{
    distance += (abs(x_pos[next[i]]      - x_pos[next[i+1]])
        + abs(y_pos[next[i]]
        - y_pos[next[i+1]]));
}
```

Figure 24:
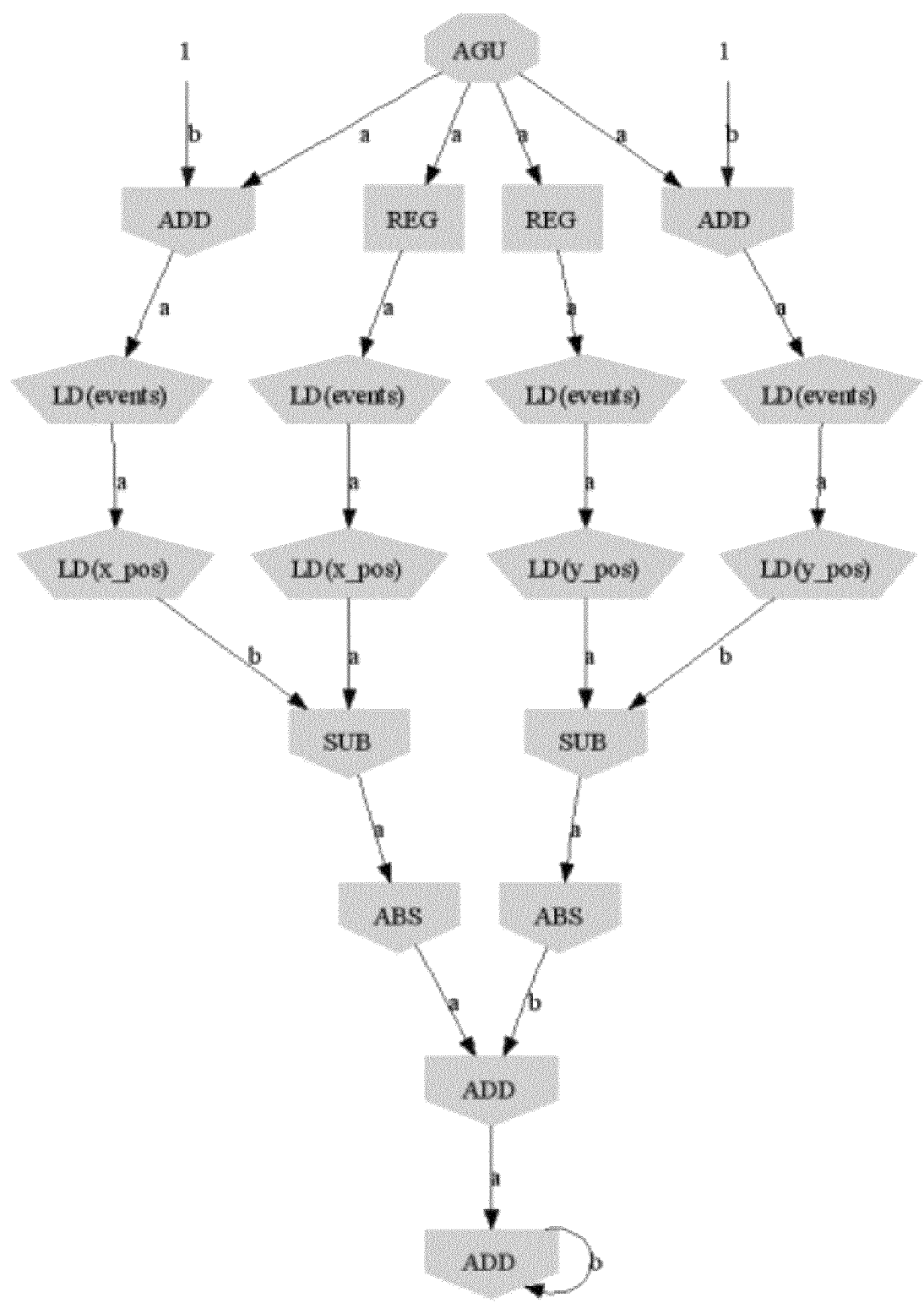
FIG. 24: One possible architecture for the TSP Evaluate function.

This code loops through all cities in order, accumulating the total distance that the traveling salesperson must travel. One possible architecture for this stage is shown in FIG. 24. In general, this stage takes the shape of a pipelined processor. The architecture shown in FIG. 24 corresponds to the internals of the loop, thus data could be streamed through on every clock cycle for 99 straight cycles. Including pipeline draining, this architecture runs in 106 cycles and consumes 176 LUTs, 176 flip-flops, and 8 Block RAMs. The search space of possible architectures for this stage is very large. The fastest architecture would consist of 98 additional copies of the architecture shown in FIG. 4, and the slowest would consist of one adder, one subtracter, one read port, etc. A simulated annealing heuristic search is employed to repeatedly generate and evaluate different architectures, searching for the smallest footprint that meets a given timing constraint Evaluate Processor The Evaluate Processor is by far the most complex of all the pipeline stages in the iterative repair architecture. This processor's job is to compute a numerical score for a potential solution. The score of a solution to this particular iterative repair problem consists of three components. A penalty is incurred for total clock cycles consumed by the schedule. A second penalty is assessed for double-booking a resource on a given clock cycle. Thirdly, a penalty is assigned for dependency violations, which occur when event "b" depends upon the results of event "a", but event "b" is scheduled before event "a". The partial scores from each of these three components are weighted and summed to produce the solution score.

Figure 7:
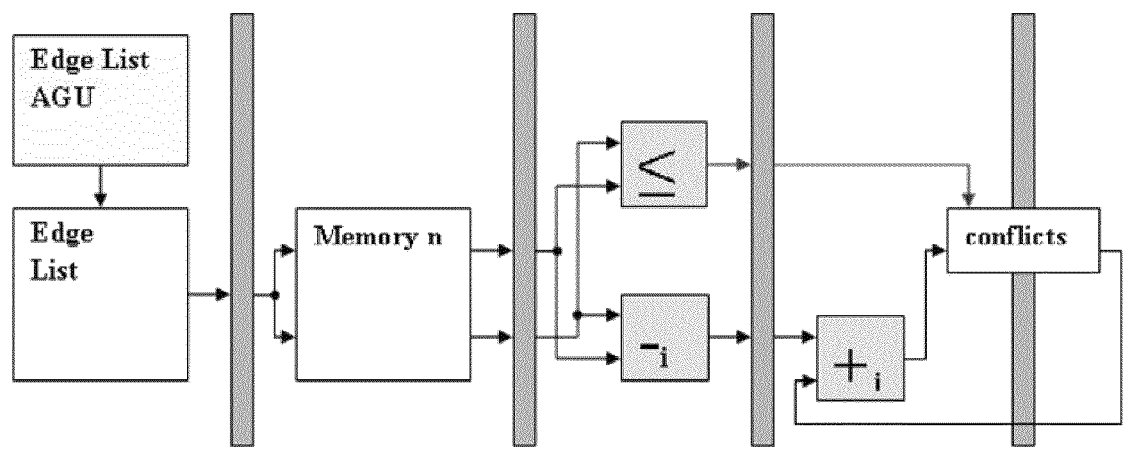
FIG. 7. Dependency graph Violation Processor architecture. This four-stage pipelines processor computes all dependency graph violations for a given schedule.

As part of the design space exploration used to design this processor, the entire evaluate stage was initially designed as a sequential processor, which resulted in a stage latency of over 600 clock cycles. Because of this latency, it was elected to exploit the parallelism inherent to the algorithm. Each of the three evaluation components described above is implemented as an individual pipelined processor. Because the three components of the score can be computed independently and combined at the end, all three processors can run in parallel, thus saving substantial clock cycles. The first sub-processor, termed the Dependency Graph Violation Processor, or DGVP, is shown in FIG. 7. The original C code from which this processor could be derived is shown here:

```
for (i=0; i<MAX_EDGES; i++)
    if (next[edge_source[i]] >=
        next[edge_destination[i]])
        conflicts = conflicts +
            (next[edge_source[i]] -
             next[edge_destination[i]]) + 1;
```

The processor is a four-stage pipeline. In the first and second stages, edge source and destination lists are used to index the solution memory and determine when parent/child pairs of events are scheduled. One approach to both software and hardware design would be to implement the adjacency matrix with a location for every parent/child combination. A one is placed in the matrix when a connection exists. For example, in FIG. 3 there is a connection from event one to event 14. This is represented by placing a one in a_matrix. A more efficient method for representing the adjacency matrix is to keep track of only those connections that actually exist in an edge list. While looking through the traditional matrix would incur wasted cycles on all event pairs that weren't adjacent, providing a list of adjacent pairs eliminates unneeded memory accesses and reduces the complexity of the stage. In the example in question, this reduces the number of look-ups needed from 10,000 (all combinations of 100 source events and 100 destination events) to only 99, which is the actual number of dependencies in FIG. 3. The runtime of the DGVP is directly proportional to the length of the dependency list. The worst-case performance of the DGVP, $O(n^2)$, occurs for a dependency graph in which each event is a parent for every other event in the graph.

The third and fourth stages determine the magnitude of the penalty, if any, to be incurred because the child event is scheduled before the parent event terminates. The magnitude of the penalty encourages offending parent/child pairs to gradually move toward each other, thus decreasing the penalty over several iterations and causing the schedule to become more optimized.

Figure 8:
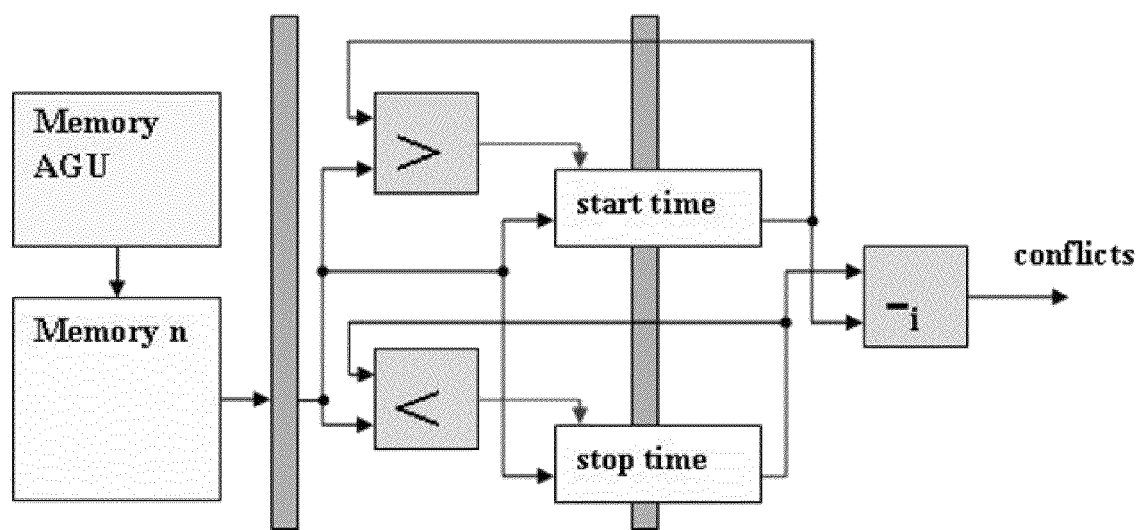
FIG. 8. The Total Schedule Length Processor architecture.

The second sub-processor, shown in FIG. 8, is the Total Schedule Length Processor (TSLP). Its job is to simply compute the total length of the schedule from beginning to end. This 2-stage processor looks through all events one-by-one, updating the earliest and latest times seen so far. Upon conclusion, the difference between the earliest and latest times is the schedule length. The C code for this process is shown here:

```
for (i=0; i<MAX_EVENTS; i++) {
    if (sched[i]<start) start = sched[i];
    if (sched[i]>stop) stop = sched[i];
}
conflicts = stop - start;
```

The TSLP executes in $O(n)$ time, as each event in the schedule is looked at sequentially.

Figure 9:
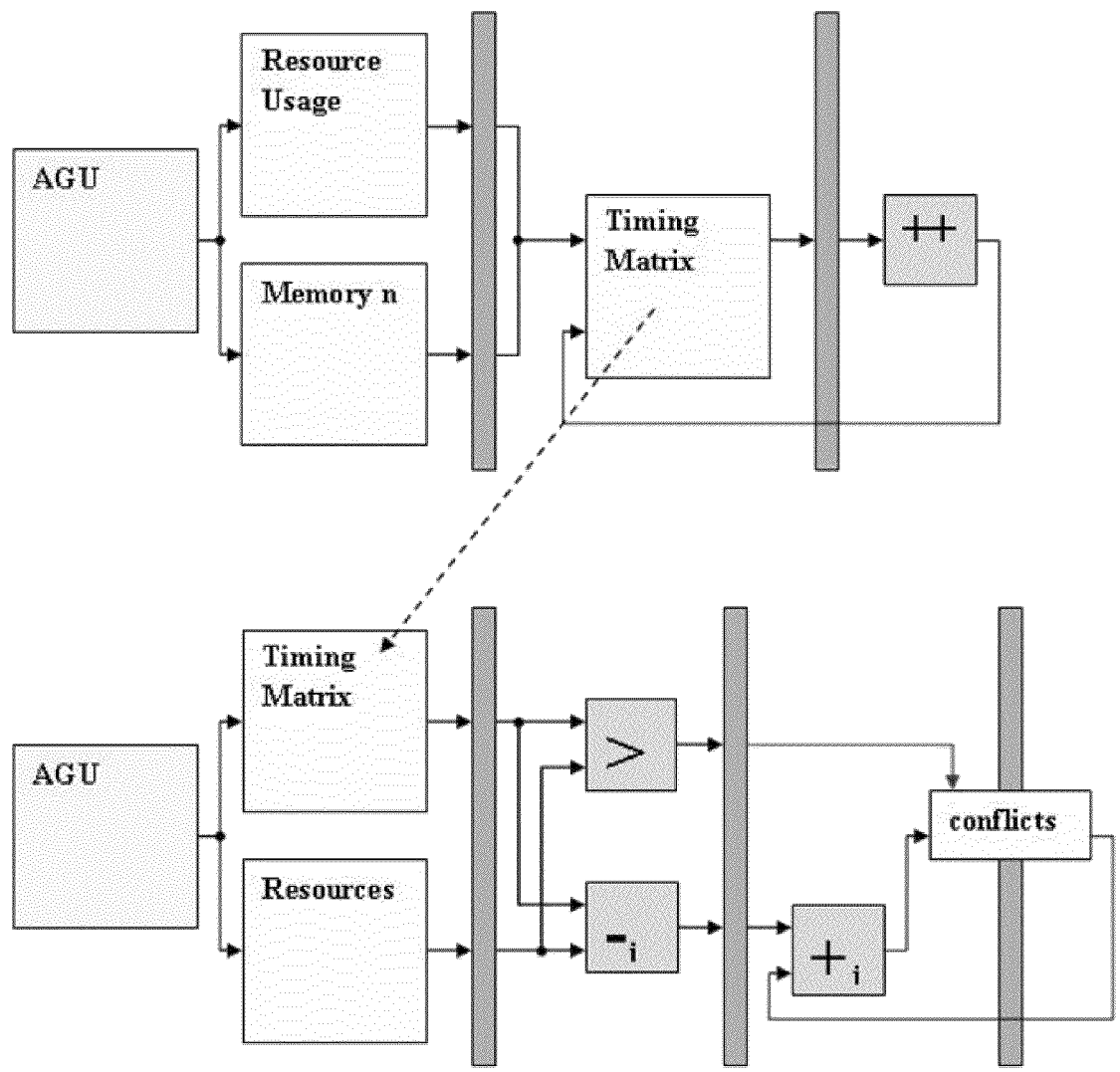
FIG. 9. The Resource Over-utilization Processor architecture. A timing matrix is first populated, and then compared against the available resources.

The third sub-processor internal to the Evaluate Processor is the Resource Over-Utilization Processor (ROP). This processor, depicted in FIG. 9, is responsible for checking for resource over-utilization on every resource for every time step. This processor is actually two different pipelined processors. The first populates a timing matrix, which is a two-dimensional matrix that keeps track, of the resource utilization of every resource for every time step. This matrix is populated by going through the events one by one and determining when each is scheduled and what resource each uses. The C code for this process is shown here:

```
for (i=0; i<MAX_EVENTS; i++)
    t_matrix[sched[i]][res_usage[i]]++;
```

This timing matrix is then passed on to the second processor, in which the utilization of each resource at each time step is compared to the total number of available resources of that type. When over-usage occurs, the amount of over-usage is added to the existing penalty. The C code for this is shown here:

```
for (i=0; i<MAX_LATENCY; i++)
    for (j=0; j<MAX_RESOURCE_TYPES; j++)
        if (t_matrix[i][j] > resources[j])
            conflicts = conflicts +
                (t_matrix[i][j] - resources[j]);
```

The HOP is the most complex sub-processor in the Evaluate stage. Populating the timing matrix is an $O(n)$ operation. Computing the score is at least $O(n)$, depending upon how many resource types are present. Thus, the complexity of the ROP processor is at least $O(n^2)$.

All three sub-processors have "done" signals. When all three have completed their tasks, the three penalty values are combined to give the total score for the given schedule of events. This score is stored in the associated main memory bank as depicted in FIG. 5. The Timing Matrix must be cleared on each iteration. To avoid using clock cycles on this clearing operation, the Timing Matrix is implemented as a double memory (sometimes called a ping-pong buffer). On a given iteration, one block is used for computations while the other is being cleared. Unlike the other stages in the pipelined architecture which remain static for any iterative repair problem, the size and speed of the Evaluate Processor are not fixed, but rather are dependent upon the size and complexity of the list of events to be scheduled.

It should be noted that the different, aspects of the solution score may have different significance. For example, dependency graph violations and resource over-utilization problems result in an invalid schedule, while total schedule length is more of a soft constraint. It is important to weight the different components of the score ($s_{DGV}$, $s_{RO}$, and $s_{TSL}$) appropriately to ensure that the final score is indeed a valid solution. This is done by forcing the worst-case valid solution to be a better score than the best-performing invalid solution. For example let us consider the event dependency graph of FIG. 3 with a maximum schedule length constrained to be 32 steps. In order to guarantee a valid final solution, three conditions must be met. The first necessary condition is that the maximum allowable schedule length be sufficient to permit a valid schedule when only one resource of each type exists. Assume that a valid solution must have zero dependency graph violations and zero resource over-utilization problems. The worst-performing possible legal solution would thus occur when $s_{DGV}$ is zero, $s_{RO}$ is zero, and $s_{TSL}$ is maximized (32 in this case).

The second necessary condition to ensure a valid final solution is that any invalid solution must generate a score of 33 or greater. The best-case invalid solution occurs when $s_{TSL}$ is one and either $s_{DGV}$ or $s_{RO}$ is also a one, while the other is a zero.

The third and final necessary condition to guarantee a valid final solution is to determine correct weighting factors for each sub-score. If both $s_{DGV}$ and $s_{RO}$ are multiplied by 32 (or shifted left by five), the lowest possible score for an invalid solution is 33.

As an additional note, constants such as initial temperature, cooling rate, and cutoff temperature must be chosen to allow for adequate iterations to perform a meaningful search of the solution space. In the example, an initial temperature of 100,000, a cooling rate of 0.9999, and a cutoff temperature of 0.0001 allow for proper searching of the solution space, in the field of simulated annealing, choosing the correct initial temperature, cooling rate, and cutoff temperature is more of an art than a precise numerical computation. In general, the higher the number of iterations, the more likely the algorithm will find the optimal solution. In this context we feel it is necessary to mention that in certain cases, illegal solutions can perhaps be acceptable temporarily. One such example would be a medium or long-term mission planning IR processor on-board a deep space mission. Mildly illegal solutions may be acceptable, as specific timing and resource constraints are not always known during long-term scheduling. These temporary solutions may then become legal when the final, short-term schedule is derived with exact timing and resource numbers.

Accept Processor

The Accept Processor's job is to determine whether to accept the next solution as the new current solution. If the next solution is better than the current solution, the next solution is accepted unconditionally. A solution that is worse than the current solution can also be accepted with a computed probability, defined in equation (1). The C code for this process is shown below:

```
delta_e = cur_value − next_value;
p = exp(((float)delta_e)/temperature);      if ((rand( ) / (float)
RAND_MAX) < p) {
for (i=0; i<MAX_EVENTS; i++)
    schedule[i] = next_schedule[i];
    cur_value = next_value;
}
```

Figure 10:
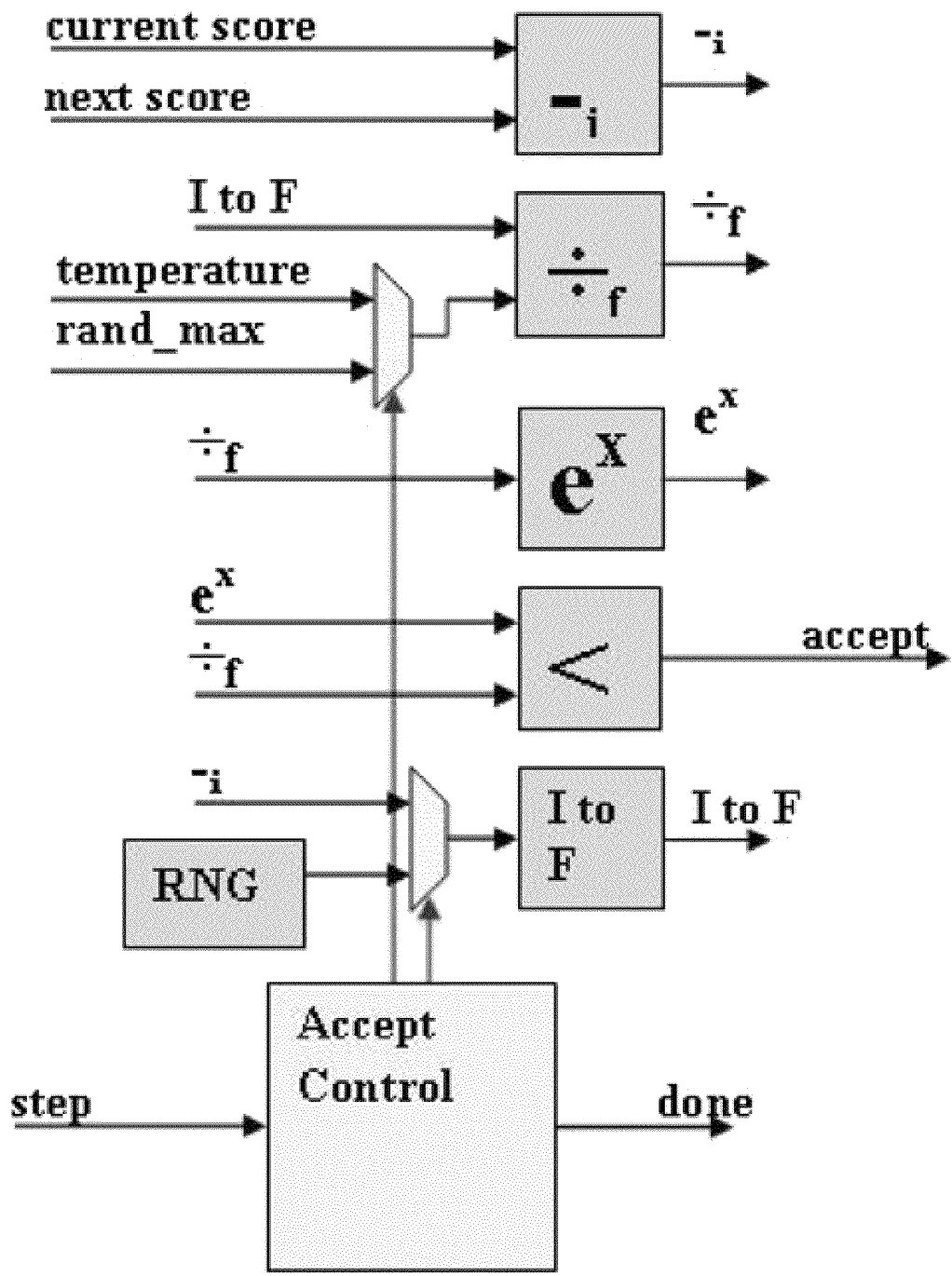
FIG. 10. The Accept Processor. The new solution is always accepted if it is better. If worse, it is accepted with a computed probability.

An architecture that supports this computation is shown in FIG. 10. This processor mixes floating-point numbers with integer numbers, thus necessitating the integer-to-float conversion module shown. The "current score" and "next score" parameters are integers, while the "temperature" and "rand_max" parameters are 32-bit floating point. The current score and the next score are read from their respective memory banks. The temperature is provided by the Main Controller. The random number generator (RNG) is a 15-bit tapped shift register. The RNG is used to generate a number between zero and one that is compared against the acceptance probability (p) to determine whether or not the new solution should be accepted. The exponential block has a latency of one clock cycle and is a floating-point unit consisting of a BRAM-based lookup table containing 1000 entries representing floating-point input values ranging from negative infinity to zero and floating-point output values ranging from zero to one. The I-to-F block is a pipelined integer to single-precision floating-point converter with a latency of six cycles. The floating-point divider is a pipelined unit with a latency of 28 cycles. The floating-point comparator is a pipelined unit with a latency of three cycles. Notice that the computed acceptance probability is a function of both the quality of the score and current temperature. As the temperature decreases, suboptimal scores are less likely to be accepted.

Adjust Temperature Processor

Figure 11:
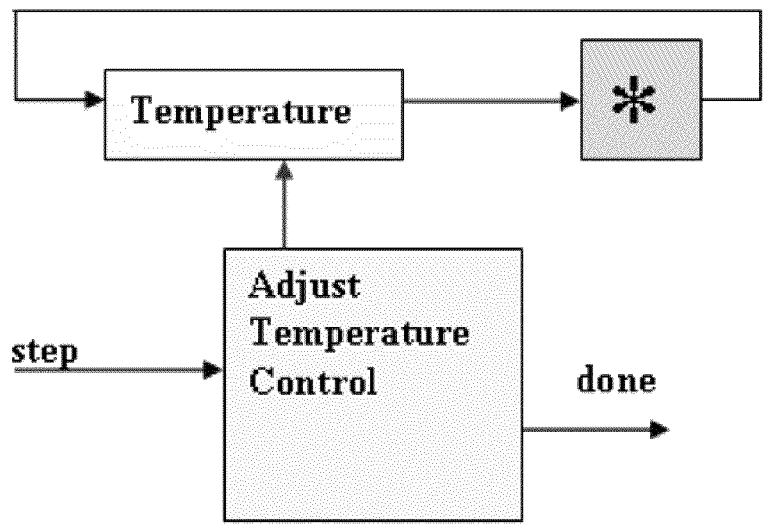
FIG. 11. Adjust Temperature Processor. The temperature is reduced geometrically each time this processing stage runs.

The Adjust Temperature Processor is a simple but critical stage in the pipelined processor. The temperature is used to compute the probability of acceptance in the Accept Processor and by the Main Controller to determine when the algorithm should complete. There are many options for implementing a cooling schedule for a simulated annealing problem. In this case a popular geometric cooling rate was used, although this could easily be replaced with a different function deemed more appropriate for a specific application. The architecture for the Adjust Temperature Processor is shown in FIG. 11. The current temperature is stored in a register. When the "step" signal is received, the temperature is multiplied by the constant "cooling rate", which for this example is set to 0.9999. This cooling rate allows the temperature to decrease slowly and geometrically, allowing for the discovery of better solutions.

Main Controller

The main controller is responsible for coordinating the sharing of data between processing stages, for allowing the pipeline to step ahead at appropriate times, and for determining when execution is complete.

Figure 12:
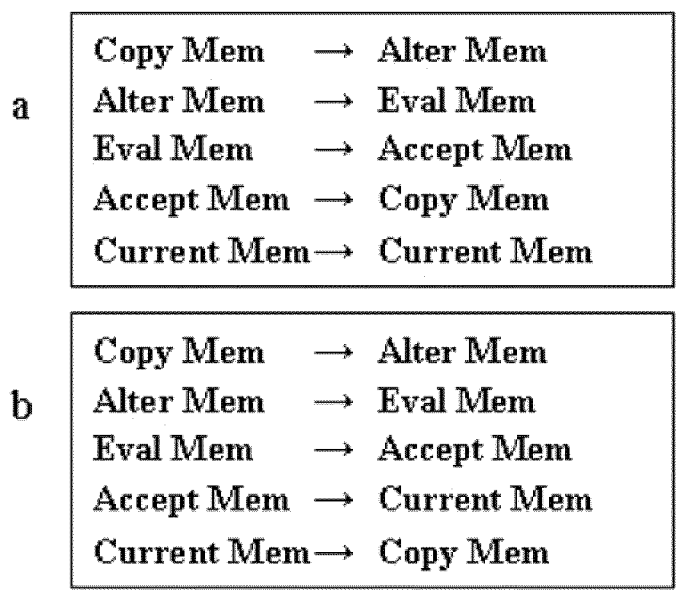
FIG. 12. Method for passing memory block; pointers between processing stages when (a) the solution in the Accept stage is NOT be accepted and (b) the Accept stage solution is accepted.

The main controller coordinates the sharing of data between stages by keeping track of the memory block that is associated with each processing stage. Upon the completion of a pipeline period, the main controller must determine how to reassign the memory blocks to the different stages, keeping track of which one holds the current solution and which one can be recycled and assigned to the Copy Processor. This decision process is detailed in FIG. 12. Two different patterns of moving memory block pointers between processors are needed: one for when the solution associated with the Accept stage should be accepted as the new current solution and another pattern when the solution associated with the Accept stage should simply be thrown out. In the case where the new solution should not be accepted, shown in FIG. 12a, the Current Pointer is not updated and all other pointers are passed to the next stage. In the case where the solution should be accepted, shown in FIG. 12b, the memory pointer from the Accept stage is transferred to become the Current Pointer and all other pointers are passed to the next stage. The main controller also performs global synchronization. As shown in FIG. 3, the main controller receives a "done" signal from each of the stages. When all stages have completed, the main controller sends out a "step" signal to each processor. Indicating that they can proceed. The main controller also monitors the temperature and halts the system when execution is complete.

Results and Analysis

The FPGA resources needed to solve this scheduling problem are shown in Table I. Each of the five memory banks uses 4 SRAM blocks, thus the 20 blocks used by the Memory Module. The problem contains 99 dependency edges. The Dependency Graph Violation Processor (DGVP) in the Evaluate Processor needs to look at all 99 edges, plus three cycles for the pipeline delay, giving a total of 102 cycles. The Total Schedule Length Processor (TSLP) needs to look at all 100 events, plus one cycle for pipeline delays, yielding 101 cycles. The Resource Over-utilization Processor (ROP) needs to look at every event to populate the Timing Matrix, which means 100 cycles plus two for pipeline draining, totaling 102 cycles. It also needs to look at every element in the Timing Matrix, which has dimensions of 32 time steps maximum latency and four resource types, plus three cycles of pipeline draining, resulting in 131 cycles. This means the Resource Over-utilization Processor has a total latency of 232 cycles. As this is the most costly of the three sub-processors in the Evaluate Processor, the total latency of the Evaluate Processor is 233 cycles plus two for the final summations, resulting in a 235-cycle latency.

The target device is a Xilinx Virtex-4 SX35, which consists of 15,360 slices, 192 DSP48 units, and 192 BRAM blocks. The design assumes 32-bit single-precision floating-point arithmetic and 16-bit integer arithmetic. Single-precision floating point is needed to maintain the integrity of the temperature variable. Experiments with lower resolution and with fixed point representations resulted in an erratic and sometimes overly rapid temperature decline, which negatively influences the means by which simulated annealing avoids the pitfalls of local minima, as discussed above. A stage latency of the pipelined processor is 235 clock cycles, with a maximum clock frequency of 197 MHz (post place and route). At this speed, the entire iterative repair algorithm, consisting of 184,198 iterations can execute in just over 43 million clock cycles, or a wall-clock time of 220 ms. As shown in Table II, this is a speedup of more than 68 times when compared to a PowerPC, without a floating-point coprocessor, running comparable code at 100 MHz. While the PowerPC utilized was an embedded FPGA core, it uses a similar instruction set and the same basic pipeline architecture as the PowerPC 750 core generally used in space applications. The most significant difference between the two is the maximum clock frequency Furthermore, the custom architecture outperforms a desktop PC by a factor of 5.2 while running at a much lower clock frequency.

The reasons for the speed-up of the custom implementation when compared to traditional linear processors are three-fold. First, the custom circuit employs a four-stage macro pipeline. This allows for four different solutions to be at different stages of processing simultaneously, rather than only managing one solution at a time in the case of traditional processors. Second, the most complex of the processing stages, the evaluate function, has been parallelized in the custom implementation to decrease the latency of the pipeline. Once again, in a conventional processor, no such parallelization can occur. Third, in a conventional processor, our analysis has shown that up to 50 percent of the computation cycles in iterative repair applications are consumed by load and store instructions, as iterative repair is a memory-access intensive algorithm. Because of the application-specific nature of the custom approach, no unneeded load/store cycles are consumed. Table III shows the load and store instructions used by each processor on a by-function basis. The percentage of instructions that are loads or stores are provided in parentheses. The custom architecture is by far more efficient in the utilization of load and store operations.

Figure 13:
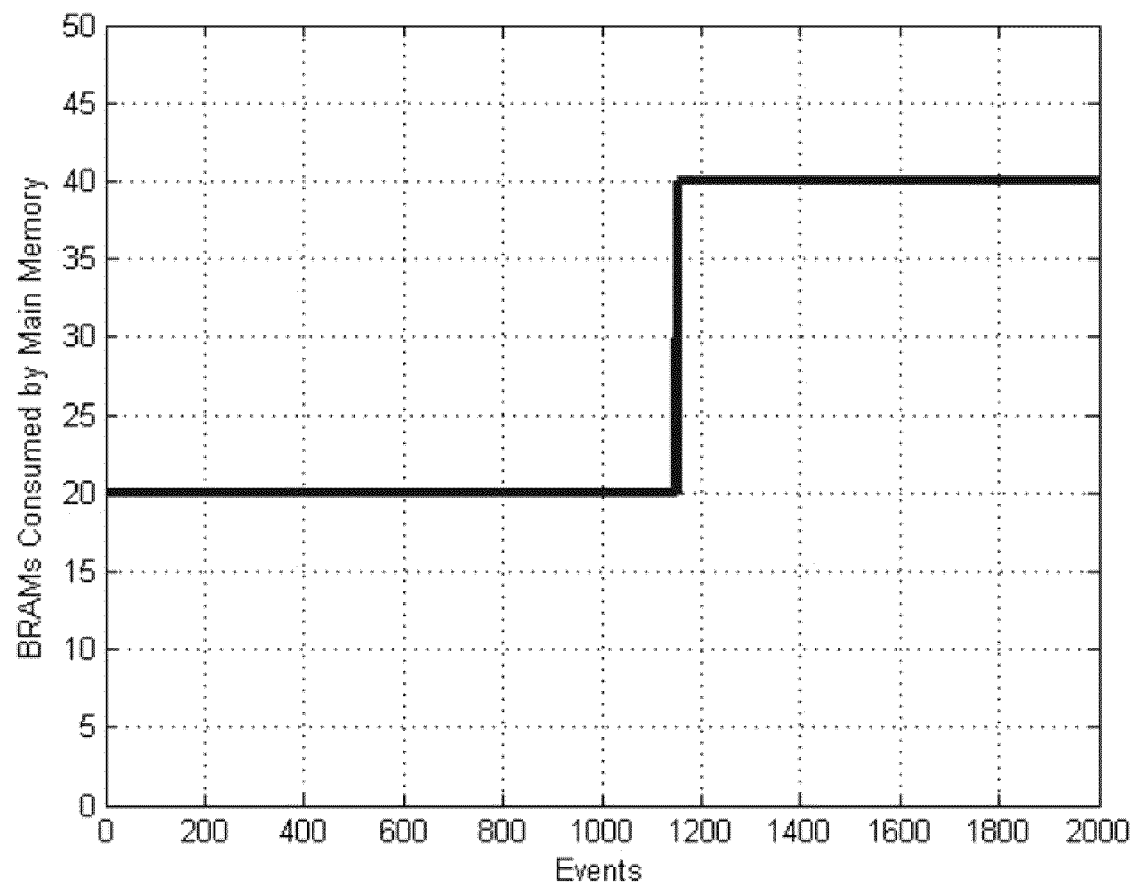
FIG. 13. Main Memory BRAM usage for different numbers of events.

Based upon the results of Table I and the associated discussion, the performance of the custom architecture for larger problem sizes can be estimated. The size of the architecture will vary minimally for different sizes of input problems. Additional address lines are needed to address larger memories. The memories themselves, which are constructed from FPGA BRAM primitives, consume no additional resources unless the physical size of a BRAM (18 kb) is exceeded. For 16-bit words, this means that a single BRAM can hold 1,152 words. If a scheduling problem consists of more than 1,152 events, the BRAM utilization of tire main memory doubles. BRAM usage is shown in FIG. 13.

Characterizing the performance in time is a much more interesting problem. In general, the ROP component of the Evaluate processor is the most costly with respect to time. The performance of the ROP can be characterized as shown in (2).

$$t_{ROP}=E+(L*R)+5 \quad (2)$$

In (2), E represents the number of events, L the maximum latency, R the number of resource types, and $t_{ROP}$ the number of clock cycles taken by the ROP processor. There is a total of seven cycles of delay associated with pipeline draining. Similar equations can be derived for computing the performance of the DGVP (3), where D represents number of dependency edges, and TSLP (4).

$$t_{DGVP}=D+3 \quad (3)$$

$$t_{TSLP}=E+2 \quad (4)$$

Figure 14:
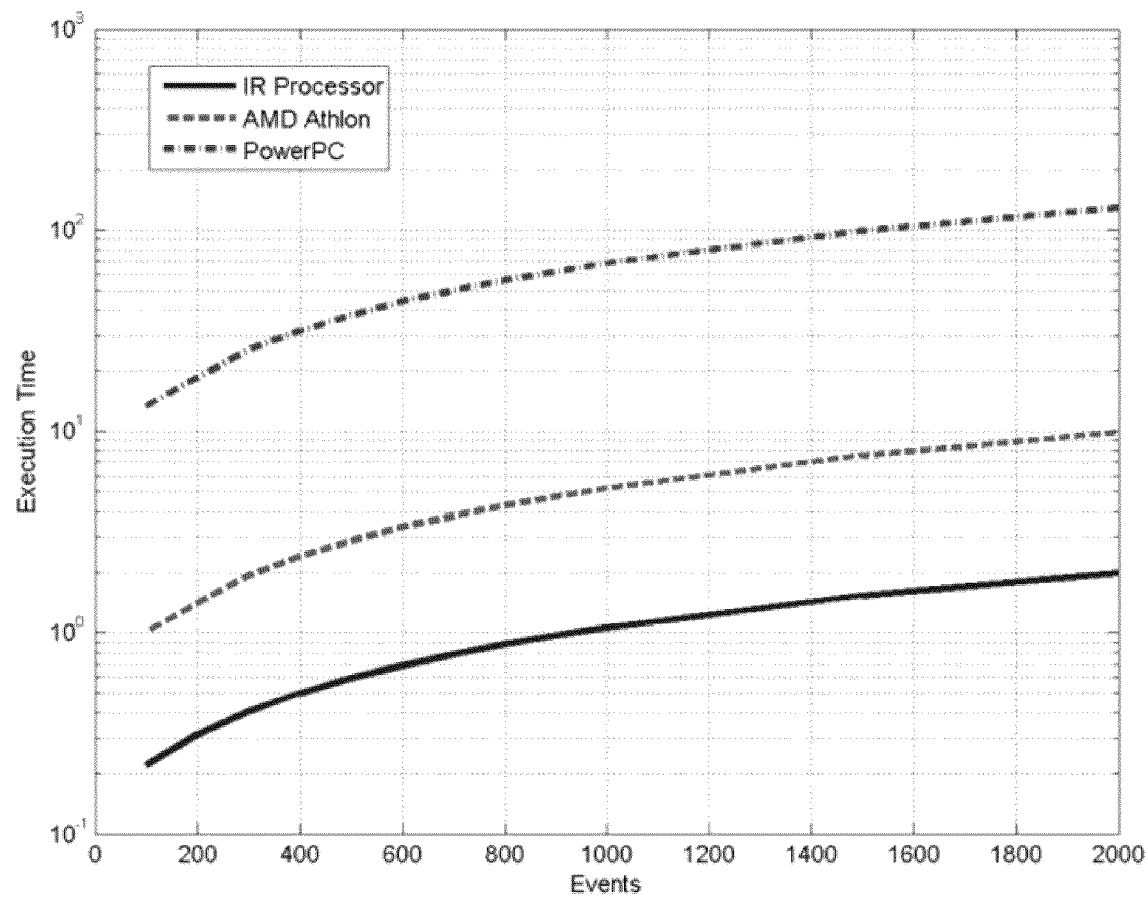
FIG. 14. Comparison of custom processor with standard processors for different numbers of events and a fixed number of dependency edges.
Figure 15:
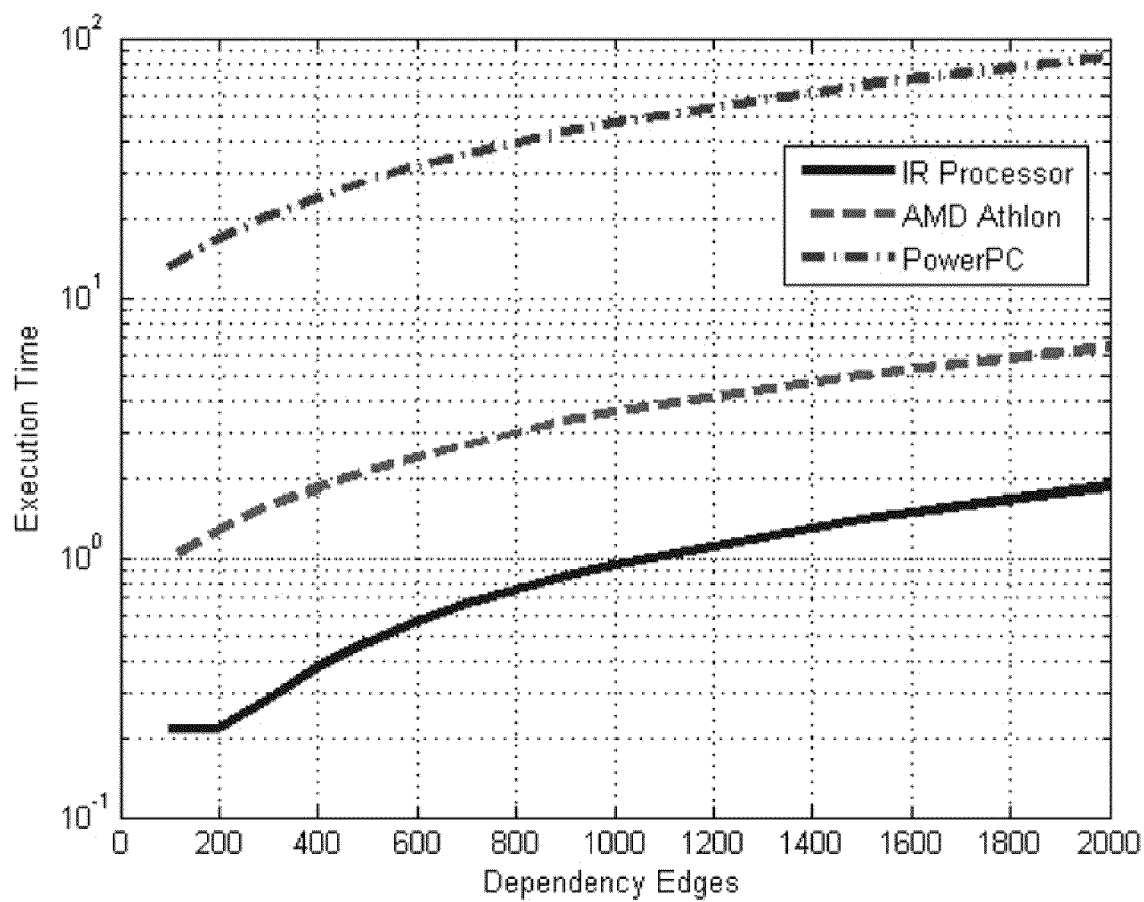
FIG. 15. Comparison of custom processor with standard processors for different numbers of events and a fixed number of dependency edges.

Based upon these equations, it can be seen that the TSLP can never be the worst performing sub-processor, as both the TSLP and ROP are dependent upon the number of events and the ROP is more compute-intensive. Either the ROP or the DGVP will dictate the latency of a pipeline stage, depending upon the relative values of E, L, R, and D. FIG. 14 and FIG. 15 provide estimates of performance of the custom architecture compared to the Athlon processor and the PowerPC for different problem sizes. In both figures, the number of resource types (R) is fixed at four and the maximum latency (L) is fixed at 32. FIG. 14 shows performance when the number of events (E) is fixed at 100 and the number of dependency edges (D) is increased from 100 to 1000. For this example, when D is less than 230 the ROP is the worst performer. At 230 or more dependencies, the DGVP takes over as the worst performer. FIG. 15 shows performance when the number of dependency edges is fixed at 99 and the number of events is increased from 100 to 1000. In this example, the ROP is always the worst performer. In both examples, the custom architecture consistently outperforms traditional processors at rates comparable to those shown in Table II.

There are a few differences between the software and custom hardware designs that need to be noted. First, in the pipelined custom hardware design, what should be done with the solution in the Alter stage and the solution in the Evaluate stage when a new solution is accepted by the Accept stage? In the sequential software implementation, this issue does not exist, as there is no high-level pipeline with multiple solutions in progress to worry about. This problem is be solved in the hardware implementation in one of two ways, either (1) flush the pipeline and start with a fresh solution, or (2) simply ignore the problem. In this architecture, we opted for solution 2 because of its simplicity. Even though the solutions in the Alter and Evaluate stages were created from a solution that is no longer the current solution, they are still valid potential solutions and can be treated as such. This saves the additional circuitry and delays needed to flush the pipeline. Because of this caveat, the custom hardware implementation may perform in a slightly different manner than the software version.

The architecture described in this disclosure is an example of hardware acceleration of the iterative repair algorithm; a custom architecture for solving one specific iterative repair problem consisting of exactly 100 events with certain dependencies, event latencies, and resource utilizations. Because the processor is targeted for an FPGA, an automated tool is disclosed which can derive the specifics of the processing stages, specifically the Alter and Evaluate Processors, and derive a novel architecture based upon the four-stage pipeline template for any iterative repair problem. It should also be noted that different iterative repair algorithms will differ significantly in the amount of parallelism that can be extracted from the Alter and Evaluate Processors. A robust design space explorer is utilized as part of the tool flow to facilitate the design of these complex stages. Design exploration can also be used to measure the tradeoff between latency and resource utilization. In the eases of a smaller FPGA or additional circuit complexity, this tradeoff becomes critical.

The performance of this architecture can be enhanced in several ways. For example, analysis can be done to determine the data precision actually needed, rather than resorting to common 32-bit floating point and 16-bit integer data types. There is a linear relationship between data widths and resource utilization for both fixed- and floating-point arithmetic units. Also, improved performance can be achieved though the extraction of additional parallelism in the Evaluate processor. Currently, the ROP, TSLP, and DGVP blocks execute in parallel, with the internals of each block being a sequential (pipelined) implementation. As the C code associated with each processor consists of one or more for loops, the technique of loop-unrolling can be introduced to improve latency while increasing resource utilization.

Another alternative to the architecture is exploitation of the parallel nature of the iterative repair algorithm. Simulated annealing is a sequential algorithm that can be pipelined, but not parallelized, at the highest level. However, similar heuristic search techniques exist that are much more conducive to high-level parallelization. Stochastic beam search is one of these. It is almost identical to simulated annealing, but a set of current solutions are maintained, rather than a single solution. A modified version of the stochastic beam search could better utilize available FPGA resources when compared with the traditional simulated annealing algorithm. The size of the solution set is a function of the available space on the FPGA. Different sets of Copy, Alter, Evaluate, and Accept processing stages would be implemented for each solution, implementing such a design would exploit parallelism in a different manner than that of the systolic architecture for place-and-route acceleration. The systolic array architecture could be adapted for event scheduling by assigning a unique processing element in the array to each event to be scheduled.

An FPGA Simulated Annealing Kernel Accelerator for Space Borne Applications

It is not unusual that a spacecraft/rover may have a set of tasks or events, that need to be completed subject to some constraints such as time, energy etc. These tasks may depend upon each other and/or may compete for limited resources. For example, a complex sequence of thruster firings and robotic arm maneuvers might be necessary to grasp a passing object, without violating known types of dependencies. A second example could be to determine the least number and types of robots (in a swarm with different sensors) necessary to explore a terrain. A third example could be a plan to visit a specific set of sites of scientific interest by a rover in the best order possible to minimize total distance traveled hence minimizing expenditure of energy in the batteries.

Such scheduling or planning problems necessary for autonomous space exploration can be solved through many techniques (enumerative or stochastic). In this paper we will focus on one type of stochastic technique: simulated annealing (SA). For instance the Generalized Robotic Autonomous Mobile Mission Planning System (GRAMMPS) system uses a simulated annealing kernel (SAK) for path planning.

While missions of the past have needed relatively simple on-board schedulers, future missions to explore outer space planets with the Moon and Mars as home bases, will require unprecedented levels of autonomy. One of the components necessary to support high levels of autonomy is a sophisticated activity planner. A data point that brings things into perspective is the recent Remote Agent experiment (RAX), flying on-board the New Millennium Deep Space One mission. It executes on a 25 MHz RAD 6000 flight processor, and takes approximately 4 hours to produce a 3-day operations plan. The conclusions from this experiment were that "While this is a significant improvement over waiting for ground intervention, making the planning process even more responsive (e.g., on a time scale of seconds) to changes in the operations context, would increase the overall time for which the spacecraft has a consistent plan."

Since space based radiation hardened microprocessors have failed to keep pace with the computation capabilities of their commodity counterparts, it is unrealistic to continue on that path and expect real time support for high levels of autonomy. Therefore the aerospace community in general has been making a paradigm shift in the area of on-board computer chips to adopt FPGAs as the primary compute intensive platform of choice. For example the Venus Express, the Mars Reconnaissance Orbiter, GRACE, OPTUS, TACSAT2, CIBOLA, and a number of classified programs have included Xilinx FPGAs. Quad-redundant XQR4062XL FPGAs performed mission-critical landing duties (pyro-control) on the Mars Exploration Rover (MER) 2003 landers, which delivered the Spirit and Opportunity MERs to the surface of Mars. Virtex XQRV1000 FPGAs handle motor control functions on both MERs as they explore the Martian landscape.

However, the caveat with FPGAs is that by and large they perform only as good as the design mapped on them. There are several obvious and not so obvious aspects of FPGAs that make them good candidates for aerospace applications. The obvious ones are that modern FPGAs are heterogeneous (DSP-48s, BRAMs, LUTs, FFs, PPCs, DCMs etc) and reconfigurable (hence allows for scrubbing, power cycling, etc). Thereby allowing complex designs (million gate net-lists) to be ported onto these fabrics which can run at up to several hundreds of MHz white consuming less than five to eight watts of power. One of the not so obvious features is that large sections of the physical layout of the underlying electronics components such as switch boxes, routing lines, LUTs, FFs etc., are identical across the V4 family of FPGAs from Xilinx. While this has been used to migrate floor planned partial bit streams across V4 family of devices, it can also be used to floor plan designs carefully on a lower cost device (V4 LX 60), test for SEU sensitivity and then port the same placed and routed designs (partial bit stream) onto a radiation-hardened device (V4 QR LX 200) for testing in a particle accelerator (expensive on a per-run basis). In our proposed approach, we have taken advantage of this feature.

SAK Accelerator

The SAK considered in this paper is shown by the pseudo-code in FIG. 16. It solves a problem that has a set of nodes in a graph that need to be scheduled. It is assumed that nodes in a graph can have dependencies and hence compete for schedule slots as well as resources. The objective is to find a schedule such that there are; no dependency graph violations (i.e. no node executes before the node(s) it, is dependent on complete execution), no resource over-utilization (i.e. in a given control step, the number of nodes allowed to use a set of resources does not exceed an available amount), and has the smallest schedule length possible (i.e. the sum of control steps from beginning to end for all the nodes to complete).

The first step is to provide an initial solution (schedule) and set key parameters such as cut_off_temperature, maximum number of allowed control steps permitted for a solution, number of events to be scheduled and number of resources available. We represent a solution in the form of an array (curSolution and altSolution), where an index indicates a unique event, and the control step when that event is scheduled forms the content.

We represent the resource an event uses also in the form an array (resource_used) where the index correlates to a unique event, and the type of resource it uses is the content. After initializing the solution and variables, the kernel invokes the classic annealing approach of copying the current solution, altering the copy, evaluating the cost of the altered solution, always accepting a better solution as well as a bad solution once in a while (with a computed probability), and iterating this process with a geometric cooling rate. We assume that all resource types take one control step to complete a task. The temperature controls when the loop breaks, and helps determine the probability of accepting a solution that is worse than the current solution. The idea is that in order to avoid local minimums that hinder progression to an optimal solution, some bad solutions need to be accepted. The first step in the loop (Copy stage in FIG. 16) is to make a copy of the current solution (curSolution) and call it as an alternate solution (altSolution). This altSolution is passed to the Alter stage, where a node is randomly chosen and assigned a new control step. A score of the quality of the solution is then computed by the Evaluate stage in three parts: dependency graph violations (DGV), resource over-utilization (ROU), and total schedule length (TSL). DGVs are determined by scanning an edge matrix (e_matrix). This matrix contains a list of all the edges in the problem. Each edge represents a dependency that must be observed between a source node (srcNode) and a destination node (dstNode). To determine if such dependencies have been violated in a solution, the DGV substage checks if the control step of a dstNode precedes the control step of the corresponding srcNode. The magnitude of all violations is accumulated in the variable altConflicts. To determine the ROU, a control step matrix (cs_matrix) is used to determine the maximum number of resources used (of each type) in a given control-step. The cs_matrix is filled by going through each node in the graph, determining what control step it is scheduled at, what resource it uses and incrementing the total number of that type of resource used, in that control step. After the cs_matrix is filled, all entries are inspected (each control step and resource type) and a penalty is added for any ROU found. The TSL is calculated by simply taking the difference between the latest and earliest control steps in a solution. Therefore the score of a solution is the summation of # of DGVs, ROUs and TSL. The determination of accepting an alternate solution is made in the Accept stage. If the score of the alternate solution is lower than the score of the current solution, it is accepted unconditionally; otherwise, it is accepted with a random probability determined by: how much worse the altered solution is and the current temperature. As the temperature decreases, it gets less probable that a worse solution is accepted. Once the loop breaks, the quality of the solution can be gauged based on mission priorities. For instance, even if a solution has a few data graph violations or resource over utilizations, interpreting it as an acceptable or unacceptable solution will depend on mission priorities. Such options (hard or soft constraints) can also be integrated into the score by suitably weighting the three components. However, in this paper we will not get into these issues.

Figure 17:
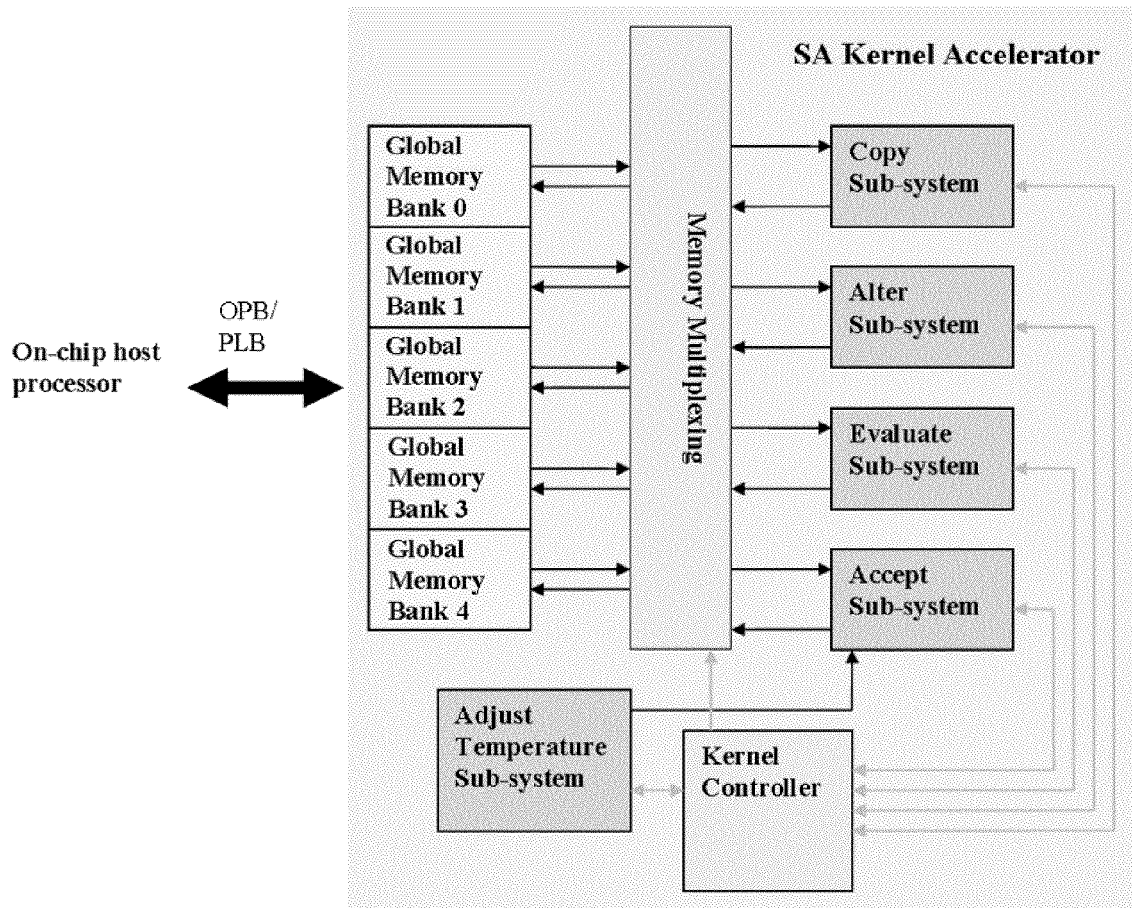
FIG. 17: The FPGA framework that, accelerates the SAK

FIG. 17 shows a block diagram of the co-processor architecture to accelerate the SAK on an FPGA. We assume that controller software responsible for the larger goal of autonomous mission planning will execute on a host processor (a soft-core Microblaze or an embedded PowerPC) and communicate with the co-processor (SAK accelerator) via an on-chip peripheral bus (OPB) or a peripheral logic bus (PLB). The co-processor is composed of (a) set of five global memory banks and an associated multiplexing network (b) five data-processing subsystems and (c) a kernel controller.

The data processing sub-systems of the accelerator are modeled on the five functional stages of the SAK (copy, alter, evaluate, accept, adjust temperature). Unlike a software model however, they take advantage of temporal parallelism by allowing multiple solutions to be processed concurrently. This is enabled by allowing the four coarse grained subsystems (Copy. Alter, Evaluate, and Accept: CAEA) to function as a pipeline. Specifically, a control step in these subsystems comprises of large blocks of clock cycles (tens or hundreds), providing the effect of a pipeline at the level of control steps. The CAEA pipeline is tightly bound to a set of five global memory banks. These memory banks (designed using BRAMs) contain potential solutions and scores and act as intermediate repositories between the CAEA sub-systems, creating the effect of a pipeline. While this is different from a software version of the kernel (only one version computed at a time: not pipelined), it however does not violate the goal of the SAK since three of the four solutions (at the end) will be flushed.

Figure 18:
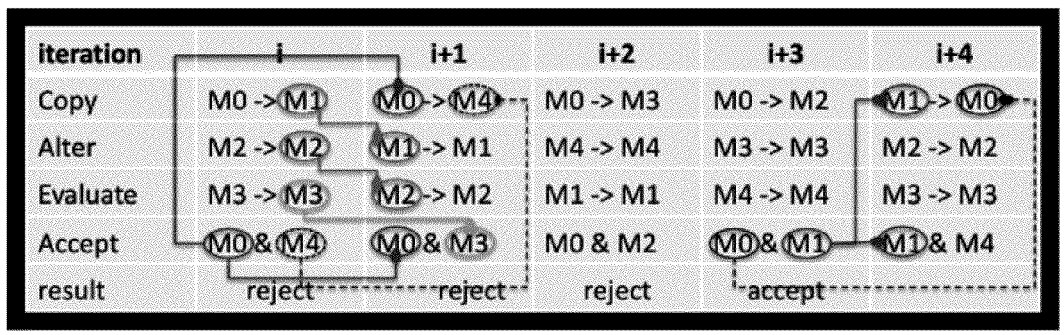
FIG. 18: Data transfer between the global memory banks

Before describing the memory and (its associated multiplexing) sub-system, it is necessary to explain how the various global memory banks act as sources and destinations for the CAEA subsystems effectively rendering a coarse grained pipeline (FIG. 18). During iteration i, the copy sub-system transfers contents of bank 0 (M0) into bank 1 (M1) and the alter sub-system performs a pseudo-random alteration of the solution in bank 2. Therefore its source and destination banks are the same. The Evaluate sub-system evaluates the solution in bank 3 over a cost function. The Accept sub-system makes a choice between the old solution residing in bank 0 and the new solution residing in bank 4. Lets suppose that it rejects the solution in bank 4. In that case, contents of bank 0 continue to be the currently accepted solution and are treated by the Copy sub-system in iteration i+1 as the golden solution (blue color). Therefore they are copied into bank 4, overwriting the rejected solution of iteration i. The solution in bank 0 is also used to then compare with the solution of bank 3 in iteration i+1. However, as shown with iteration i+3, if the solution in bank 1 is accepted over the old solution in bank 0, then it is treated as the golden solution (blue color) and used to overwrite the contents of bank 0. From this illustration it can be observed that to take advantage of temporal parallelism available in most SA kernels (and certainly the SAK presented in FIG. 16), it is conservatively necessary to design five memory batiks that can be accessed concurrently by all four sub-systems in the CAEA pipeline.

Figure 19:
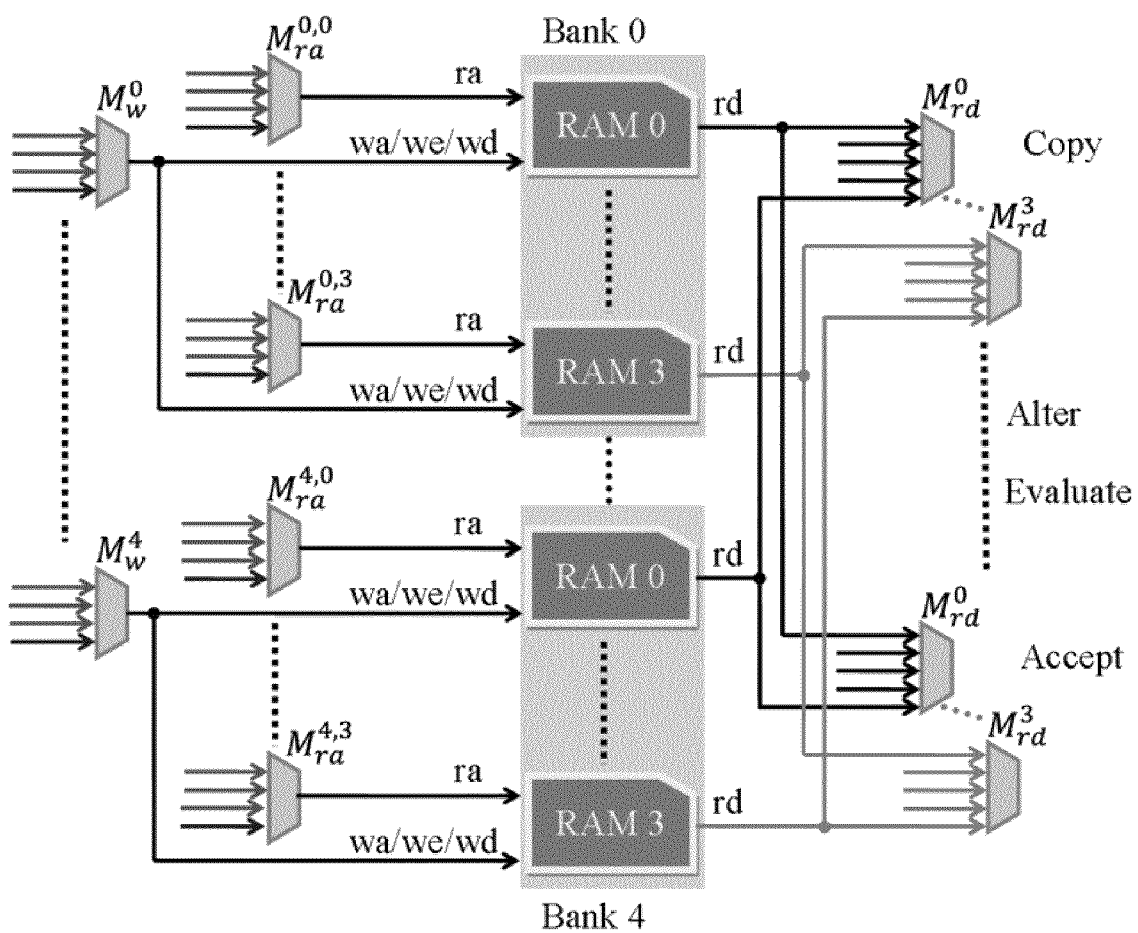
FIG. 19: Multiplexing circuits associated with the global memory banks. The read address multiplexers have an input from each sub-system represented by different colored lines. The read data multiplexers have an input from each global memory bank.

The memory (and associated multiplexing) sub-system is shown in FIG. 19. Given that, the SAK can schedule up to 100 events on a set of, up to 16 resources (of no more then 4 types), a solution can be represented by 1616 bits: 16 bits for each element (representing a control step) and 16 bits for the score. This influenced the design of the five global memory banks, each of which consist of four BRAMs (implemented with one read and one write port) configured with 16 bit wide addressable locations, considering that one word (16 bits) is fetched from a read port per cycle. Upon a cursory inspection, it can be observed that the slowest sub-system in the pipeline will be the Evaluate stage. While several of the loops in this stage can be unrolled to reduce its latency, in this paper however, we restrict ourselves to exploring the simplest form of concurrency available: reading four values simultaneously from a memory bank to supply the DGV, ROU and TSL stages. While this design allows for concurrent reading from four address locations (in a bank), it requires four copies of a single address space (representing a solution). Since there are four data-processing sub-systems (CAEA) that can concurrently read from any of the memory banks (based on example provided earlier with FIG. 18), the multiplexing network consists of a series of read-address multiplexers (four to one) $M_{ra}^{i,j}$. These multiplexers in a given bank allow only one of the four data-processing sub-systems to read up to four data points from four address locations, in a given iteration. The data read out of the memory banks are then passed into a set of read-data multiplexers $M_{rd}^{i}$. A set of four such multiplexers are dedicated to each of the subsystems in the CAEA pipeline. The only exception is that two such sets are dedicated to the Accept sub-system (but not shown in FIG. 19) to allow reading of solutions (old/current and new/alternate) from different memory banks. Writing of data is carried out through the write_multiplexers $M_w^i$. These multiplexers carry the address, data and enable lines. To maintain coherency among the four copies of a solution in a memory bank, the RAM modules in a memory bank are all tied to the same write_multiplexer's output.

The kernel controller coordinates the communication between the CAEA sub-systems and the Adjust Temperature sub-system. The kernel controller sends a step signal to each sub-system to trigger the commencement of a control step, and collects a done signal from each sub-system, thus synchronizing the architecture. It also manages the data-routing network to distribute data among sub-systems. We now discuss each sub-system in detail.

The Copy sub-system (FIG. 20a) transfers contents (solution) from one memory bank to another (word-by-word). The Alter sub-system (FIG. 20b) selects one event randomly from the solution string and randomly assigns it a new control step. The pseudo random number generator (PRNG) is a 15-bit linear feedback shift register (LFSR), which generates a new integer between zero and 32,767 when triggered by a step signal. The incoming bit of the shift register (bit 0) is derived by passing bits 14 and 13 through an XOR gate and inverting the result. The floating-point divider divides the pseudo-random number first by the maximum number of events and then by the maximum latency to obtain remainders Module of Evaluate, (f) Accept Sub-system, and (g) Adjust Temperature Sub-system, that are stored as address (index into a memory containing events) and data (control step of that event).

The Evaluate sub-system computes a numerical score (DGV+TSL+ROU) for each potential solution. Since the three components of the score can be computed independently and combined later, they can operate concurrently. Each component contains one or more address generation units (AGUs) to drive the access of data from both, local storage (i.e. e_matrix, cs_matrix) and (global) memory banks (Memory banks 0-4 of FIG. 17). All arithmetic and logic units in the Evaluate sub-system operate on 16-bit integer data. The Dependency Graph Violation module is shown in FIG. 20c. This is a four-stage pipeline where, in the first stage, elements in the control step matrix (stored in local memory as a RAM) are pulled out to get the source and destination event addresses with a dependency. Accessing the control steps of these events from the global memory banks are carried out in the second stage. The third stage subtracts the destination control step from source control step and uses a comparator to determine whether a dependency graph violation has occurred. The fourth stage accumulates the magnitude of each dependency graph violation. The ROU module is shown in FIG. 20d. It consists of two distinct pipelines: p1 and p2. The p1 pipeline first looks up the control step and resource type of each event. These values index a location in the control step matrix whose contents are incremented. Once the control step matrix is completely populated, the p2 pipeline looks through the control step matrix (element by element) and compares the contents (required resources) with available resources for each control step. These two entities are subtracted and the magnitude of the resource over utilization is accumulated. The TSL module is shown in FIG. 20e. The Accept sub-system (FIG. 20f) determines whether to accept the next solution as the new current solution. Since the solution scores are represented as 16-bit integers and the temperature as a single-precision floating-point number, this module uses an integer to floating point conversion unit (I to F). The alternate solution is accepted if the probability computed is less than the scaled random number (output_PRNG/rand_max). The floating point divider and the I to F convertor are time multiplexed to take advantage of the slack available before completion of the control step thereby reducing the footprint of the Accept sub-system. The Adjust Temperature sub-system (FIG. 20g) lowers the annealing temperature at a geometric rate.

Performance of the SAK Accelerator

Since the SAK has been designed to solve problems with up to one hundred nodes onto a set of up to sixteen resources (belonging to four distinct types), there are a large variety of problem sizes that can be tested for the purpose of comparing the performance of a PPC 750 and the FPGA based SAK accelerator. In Table IV we present example cases. We ported the software version of the SAK onto a cycle accurate emulator of the PPC 750. This processor was chosen because it is architecturally equivalent to a state of the art space based microprocessor (BAE Systems RAD 750) that has a floating point unit and runs @ 200 MHz. The FPGA of choice was a Xilinx Virtex 4 LX 60. The designs on the FPGA after place and route can be clocked at a maximum of 155 MHz. For the sample of test cases shown, we considered as inputs a random collection of events and edges (forming fully connected directed graphs) that need to be scheduled onto a set of sixteen resources subject to some maximum number of control steps (Max#CS). Not surprisingly, the FPGA design (despite being clocked at only about 150 MHz) outperforms the PPC by two orders of magnitude, making it a possibly promising candidate for space-borne autonomous mission planner and scheduling platform. While it must be observed that the hardware version of the SAK processes four solutions simultaneously, it none the less still gives two orders of magnitude speed up over a PPC option, if that factor is accounted for.

Brief Survey of SEU Mitigation Techniques on FPGAs

Although Table IV provided some promising results that make an FPGA design attractive for autonomous mission planning and scheduling via a SAK, it does not address a critical issue; fault protection from SEUs (vital to make this a feasible option).

Therefore we will now focus on the SEU mitigation aspect. Today's state-of-the-art radiation hardened SRAM FPGAs are computationally powerful enough for demanding-space-borne applications such as image processing, radar signal processing, software defined radios, event scheduling etc. But space-borne FPGAs are susceptible to a variety of problems due to exposure to space radiation. Among them, serious ones that are detrimental to the device such as total ionization dose (TID) and single event latch-up (SEL) are mitigated/protected against by the device manufacturer. For instance the Xilinx V4 radiation-hardened series offers protection up to 300 krads for TID and a SEL immunity of greater than 125 MeV-cm$^2$/mg. However SEUs seem to be the only potentially significant problem. These need to be protected against or their effects mitigated by design techniques such as TMR, Double Modular Redundancy (DMR) etc. TMR is triplication of a hardware module along with voters as necessary to select the correct output of the device. However, if multiple modules are involved in a design, intermediate voting of TMR protected modules is optional at the cost of not being able to mitigate multiple independent upsets. This technique can tolerate up to one of the three modules being affected by an SEU because a majority voter can be used to mitigate the error without interruption to the computation of the circuit. TMR is a more reliable and area effective compared to techniques such as time shared TMR (TSTMR), quadruple time redundancy (QTR), explicit error correction (EEC), and implicit error correction (IEC). This technique has also shown to be more useful than Hamming codes for protecting small memories.

But TMR is an expensive technique in terms of area overhead (>200%). Therefore several other options have been explored in the past, where slightly lower levels of reliability were acceptable or the time to detect and repair faults was less stringent (availability of slack in completion of task). For instance Double Redundancy with Comparison combined with Concurrent Error Detection (DWC-CED) was proposed where two modules that perform the same operation are implemented and outputs are compared. When outputs disagree, an additional clock cycle is used to invoke the CED circuit that tries to identify the correct module. However there does not exist one CED technique that work best for all circuits, therefore several options need to be carefully explored/customized and tested for specific circuits. DMR-in-Time has been used to correct errors. When an error is detected, the operations in a pipeline are redone. This was prototyped on a FPGA, but does not consider configuration corruptions. More recently sophisticated capabilities of FPGAs such as partial dynamic reconfiguration have been used to scrub selected frames on the device affected by an SEU. This was accomplished by using floor-planning tools to layout the design, hence providing the scrubbing circuit with complete information of frame addresses that need to be scrubbed. We also take a similar approach by laying out the SAK accelerator in a PR (partial reconfiguration) region on the FPGA, such that it can be scrubbed periodically to overcome problems such as accumulation of errors that can overwhelm fault mitigation circuits. We also floor-planned the design such that the frames on which it resides are identical in layout with the radiation hardened Virtex 4 QR LX 200. This allows for reliably porting the partial bitstream of the SAK accelerator onto this part for ion-beam testing.

DMR-RtC: a Fault Mitigation Technique

While TMR is a well-established approach, there are certain components of the SA kernel accelerator that allow for a lower area overhead approach. We present a technique called DMR-RtC, which is the hardware equivalent of a well-known software based method called recover-to-checkpoint. This variation of DMR uses recovery points to restart the operation upon detection of an error and also triggers a scrubbing circuit to correct the affected configuration frames. To help explain how the technique can be applied, let us consider FIG. 21, a simple representative illustration of the components of a DMR-RtC protected circuit. The group of modules $B_x$ ($B_0$ and $B_1$), are the targets of this technique. Each $B_x$ can receive inputs from another $B_x$ module or an external module $A_x$ (protected using TMR). If the input is from an external module, it is assumed to come from the voter of the $A_x$ module. There is one voter for each of the $B_x$ modules as shown in the TMR to DMR interface. This prevents the voter from being a single point of failure. In order to allow for a recovery to a checkpoint, it is necessary that the design allow for data representing a check-point to be stored in the storage elements $M_x$.

Figure 21:
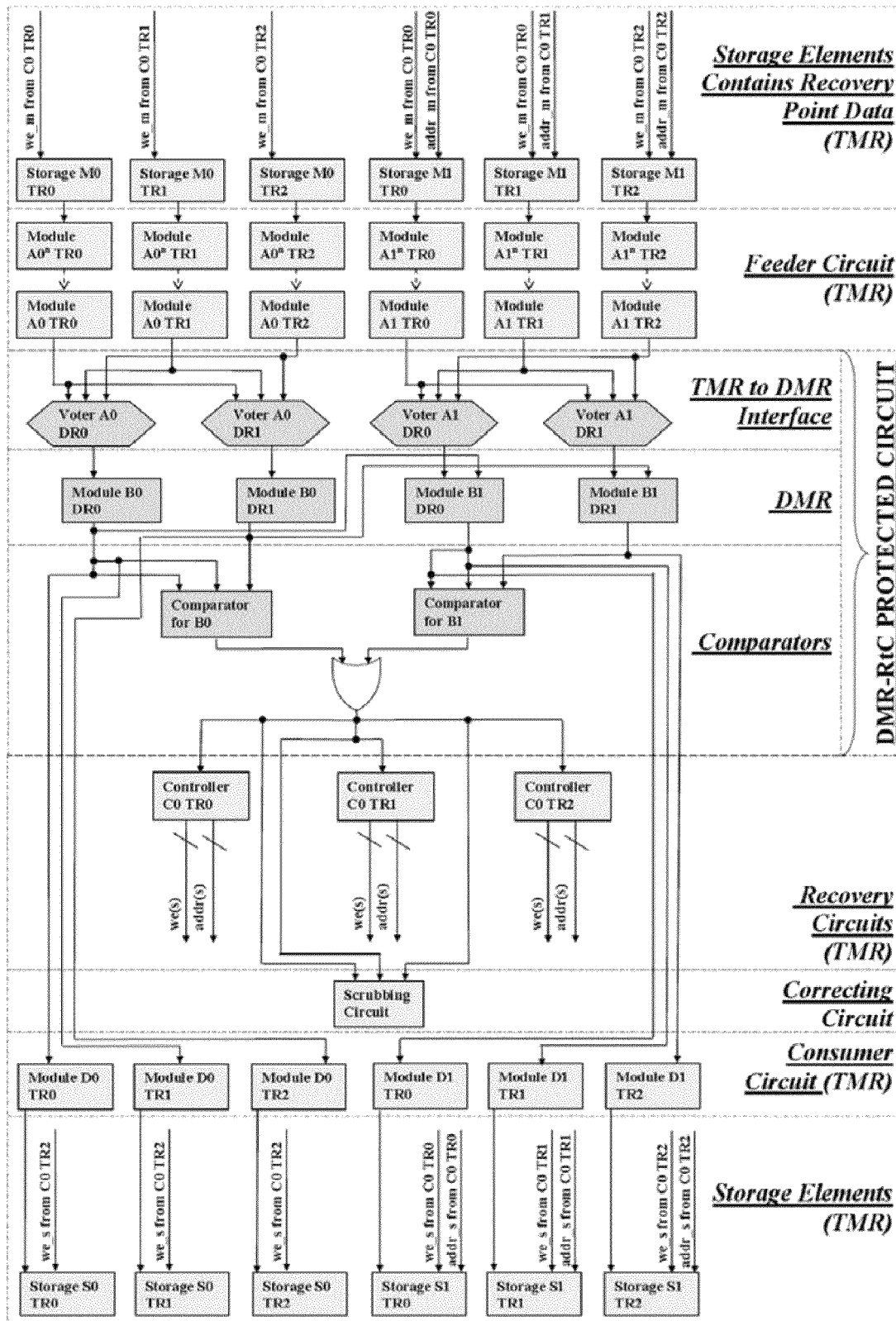
FIG. 21: DMR-RtC design layout. TRx refers to one of the triplicated copies version of a modules. DRx refers to one of the duplicated version of a module.

These storage elements can either exist at the inputs or outputs of $A_x$ modules. Shown in FIG. 21 is an instance where the $A_x$ modules have registered inputs but not registered outputs. Further, the $M_x$ elements need not be present immediately prior to an $A_x$ module, it only needs to be the latest possible storage element in a chain of $A_x$ modules (shown in FIG. 21 as $A_x''$ . . . $A_x$) prior to feeding a $B_x$ module, it is also necessary that the process (or circuit) writing values into these $M_x$ storage elements be controlled by a write_enable signal, generated by controllers $C_x$. This helps ensure that the use of a recovery to checkpoint technique is valid, in order to mitigate an error in the checkpoint data, we propose to triplicate the $M_x$ storage elements, if a $B_x$ module supplies processed data to a consumer circuit (module $D_x$), we fan one of the outputs of a duplicated module into two copies and then drive a 3:1 comparator. This comparator is used to detect an error in the $B_x$ modules, i.e. if there is any disagreement between the inputs to the comparator it asserts the error signal. While usually a DMR circuit needs only a 2:1 comparator, we have used a 3:1 comparator. There are two reasons for this: (a) it is assumed that the DMR protected circuits can feed TMR protected circuits ($D_x$). (b) As users of the Xilinx ISE tools, we unfortunately have no control over how routing switch boxes are used to enable fan-outs.

To understand this, let us assume that we proceed with the use of a comparator with only two inputs. Further let us consider that each switch box in an FPGA is as shown in FIG. 22a, to enable communication between drivers and consumers along the north, south, east and west directions. To support a fan-out of three, assuming module $B_0$ is the driver (FIG. 22b) and $D_0$ TR0, $D_0$ TR1 and Comparator to $B_0$ are the three consumers, two approaches can be taken by the routing tool. The first approach can result in the use of switches $S_1$, $S_2$ and $S_3$ creating one fan-out point. In this scenario if the pass transistor $PT_1$ gets open circuited by an SEU, then the comparator will be able to detect a discrepancy between its two inputs. However, if the routing tool decides to use a set of two fan out points (Routing box 1 and 2) as shown in FIG. 22c, this will result in two pass transistors leading to the routing boxes ($PT_1$ and $PT_2$). If an SEU affects $PT_2$, the comparator that has only two inputs will not detect any error, but the modules $D_0$ TR0 and $D_0$ TR1 can receive unpredictable values because their inputs are floating (open defect) and susceptible to electronic noise. Therefore to overcome this problem, we have used a 3:1 comparator with three fan-out points (forced by passing the signal through 1-input LUTs) as shown in FIG. 22d. An SEU affecting any of the pass transistors ($PT_1$, $PT_2$, $PT_3$ or $PT_4$) will not allow the comparator to miss detecting the SEU. Since the $D_0$ modules are TMR protected, SEUs on any other pass transistors in the routing network will not result in error propagation downstream. A forced fan-out is also used on the output from the comparator to avoid the problem of miss detecting the SEU.

The controllers ($C_x$) behave a little different depending on the nature of the $M_x$ and $S_x$ storage elements. If $M_x/S_x$ is a register ($M_0/S_0$ in FIG. 21), then the controller holds the we_m/we_s, write enable for $M_x/S_x$ registers line low (disable mode) until modules $A_x$, $B_x$ and $D_x$ have completed operations on one set of data supplied by $M_x$ registers. During this process, if an SEU affects any of the circuits in the DMR protected area, the low value on the we_m/we_s line, ensures that $M_x$ registers resupply the previously stored data (recovery point). However, if the $M_x/S_x$ modules are RAM blocks ($M_1/S_1$ in FIG. 21), then (in the case an SEU is detected) the controllers also supply a stored pointer to a recovery point on each of the address lines (addr_m/addr_s). If no SEU is detected, the next set of new address values are supplied on these lines. If any of the comparators detect an SEU, then a dedicated scrubber circuit, is employed to reconfigure the frames on the FPGA that house the DMR protected circuits. This is in addition to invoking a periodic scrubbing of the entire FPGA.

In order for a module (arithmetic-logic circuit) to qualify for DMR-RtC protection, it must be part of a control-data flow structure that permits storage of checkpoints at the inputs of the module. However to make it a viable option over TMR, the area taken by the support logic (TMR→DMR interface+Comparators+recovery logic+fan-out point LUTs) must be less than the area of the module. But caution must be used when applying such a technique because of the time needed to scrub the duplicated module and overhead logic on an FPGA runs into a handful of millions of clock cycles (a few milliseconds). Therefore if the FPGA is deployed in an environment that has an average SEU rate of one per every couple of hours, and is not a hard real time system, then this is a good option. From our experience, we would like to point out two Virtex 4/Xilinx device/EDA-tool specific caveats: (i) If voting of clock lines entering the DMR-RtC protected area, is avoided (assuming that clock gating is not a good design approach), then a SEU detected by the comparators necessitates scrubbing of additional frames that carry the clock from the source (middle of the chip) to the DMR-RtC protected area, (ii) With respect to the use of Xilinx EDA (electronic design automation) tools for protecting modules through the DMR-RtC method, it is necessary to constrain all of those modules and overhead circuits (including routing) to a PR (partial reconfiguration) region. This ensures that device routing for these circuits are tightly controlled and also enables precise scrubbing.

DMR-RtC and TMR Applied to the SAK Accelerator

Figure 20:
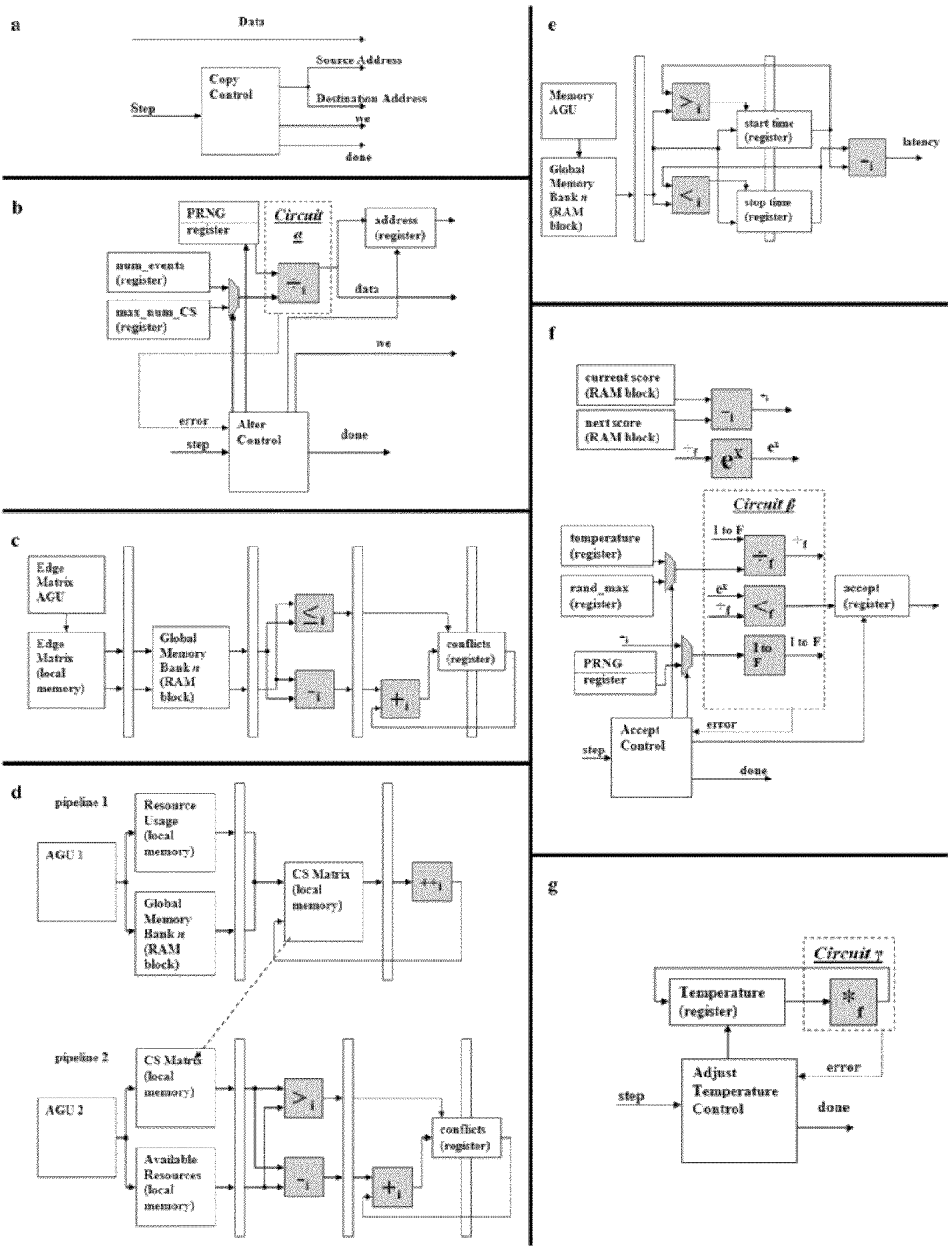
FIG. 20. (a) Copy Sub-system, (b) Alter Sub-system, (c) Dependency Graph Violation Module of Evaluate, (d) Resource Over-utilization Module of Evaluate, (e) Total Schedule Length

Having introduced DMR-RtC, we will now describe how it is applied to specific components of the SAK accelerator, and how it communicates with the rest of the circuit (protected by TMR). In FIG. 20 while all of the shaded circuits qualify for protection using DMR-RtC, only circuits α, β and γ were viable. Circuit a (in FIG. 20 b) receives two inputs: from a random number generator (with registered output) and from a multiplexer. The multiplexer itself receives inputs from a pair of registers. The PRNG circuit updates the value in its output register only when it receives a write enable from the Alter controller. This establishes the possibility of interpreting contents of this register as a checkpoint. The inputs to the multiplexer are from RAMs (set as read only memory), therefore can be assumed to be permanently fixed checkpoints. A single integer divider requires 560 FFs and 287 LUTs. If it is protected by the DMR-RtC method the support logic requires 120 LUTs, bringing the total area of circuit a to 1120 FFs and 694 LUTs. But a TMR protected version of Circuit α requires an additional divider instance, which brings the required area to 1680 FFs and 861 LUTs.

While the multiplexer can be protected with DMR-RtC (due to availability of a check point), it is however not a good candidate because it would require 96 LUTs, as compared to 80 LUTs if TMR was used. This is because additional voters (TMR-DMR interface) would be required between the RAMs and the multiplexers. The PRNG is also not a good candidate for DMR-RtC because its register (protected by TMR) is storing the check point for the divider. Thirdly, the Alter controller ($C_x$ in FIG. 21) does not qualify to be protected by DMR-RtC because it initiates recovery to check point.

In FIG. 20f, circuit β, which is composed of a single precision floating point divider and comparator, and an integer to floating point conversion module (I to F), is a good candidate for DMR-RtC. The I to F module receives its input from a multiplexer, which further receives its inputs from an PRNG (registered output) and an integer subtraction module. The integer subtraction module receives both its inputs from RAM blocks. Therefore, in relation to FIG. 21, this set of combinational logic and storage elements should be interpreted as follows: If the I to F module is considered to be $B_x$, then $A_x$ consists of the multiplexer and the integer subtraction module; and $M_x$ is a combination of the output register of the PRNG and the RAM blocks. The support logic for protecting the I to F module needs 142 LUTs while the area of the module itself is 147 LUTs and 197 FFs. Therefore we chose the I to F module to be protected by DMR-RtC.

Circuit β also consists of a floating-point divider, which receives one of its inputs from the I to F module and another input from a multiplexer. The multiplexer in turn gets its inputs from storage elements (a register and a RAM). Therefore in relation to FIG. 21, this module qualifies for DMR-RtC protection. The resources required for the support logic consists of 64 LUTs, while the module itself requires 809 LUTs and 1385 FFs. Hence we have protected the divider module with DMR-RtC. The comparator in circuit β gets one of its inputs from the divider and the other input from an exponent computation module. While the input from the divider can be interpreted (with reference to FIG. 21) as an input from a DMR-RtC protected module ($B_0$), the input, from the exponent computation module most be interpreted as an input, from a potentially TMR protected module ($A_1$), which receives its input from the divider. Hence the storage elements along this path to store the check point will be the temperature register, PRNG register and the rand_max RAM. The area required for the support logic is 67 LUTs while the area for the module is 82 LUTs and 16 FFs. Therefore we protected the floating point comparator module with DMR-RtC.

While the exponent computation module and integer subtraction modules qualify for protection with DMR-RtC, they were both not protected with this technique for different reasons. The support logic required for protecting the integer subtraction module would have been 81 LUTs, while the area of the module itself needs 48 LUTs. However, the reason for not protecting the exponent: computation module with DMR-RtC is that this module is implemented using Block RAMs. This uniquely prohibits us from being able scrub it in case an error is detected. But two alternative approaches can be taken: (i) If DMR is used, then contents of each address location in a BRAM must be protected with a parity bit. If an error is detected by a user designed comparator, then we can potentially copy the contents of the duplicated address location's content which passes a parity bit check into the corrupted location. However, a single event upset can cause a large amount of BRAM content corruption. Therefore this approach does not guarantee correct detection of an error by the parity bits, (ii) If TMR is used, such that the BRAMs are spaced apart physically on the chip, two uncorrupted copies can repair the corrupted BRAM. Therefore we chose to use TMR to protect the exponent computation module.

Circuit γ in the adjust temperature module, consists of a floating-point multiplier. This is the simplest possible version of a circuit that qualifies to be protected by DMR-RtC. The support logic requires 166 LUTs while the module itself requires 69 LUTs, 223 FFs and 5 DSPs (297 resources). Therefore we have protected this module with DMR-RtC.

While all other modules in the SA kernel accelerator were protected by the well-known TMR technique, we would like to justify the reason for not using DMR-RtC for some modules that qualified. In FIG. 20c the support logic area of the integer comparator/adder/subtraction would have been 117 LUTs while the area of the module is 16 LUTs. It can be observed that hypothetically the adder, subtracter and comparator modules can be protected by DMR-RtC by sharing a common support logic controller. Despite this possibility, the overall area still does not compare favorably with a TMR protected version (445 LUTs vs 144 LUTs). A similar argument holds for the arithmetic logic modules of FIGS. 20d and 20e. All the memory modules in the system are protected through TMR.

Analysis

While there are several approaches to testing a design ported onto an FPGA for SEUs, we have adopted a method where the tester circuit and design under test (DUT) are both laid out on the same FPGA. The advantages of this method are; (i) It enables fast injection of faults in the configuration bitstream. Specifically the time required to inject one fault into a configuration frame externally (from the host desktop computer) is 628 μs, compared to 34 μs using the on-chip internal configuration access port (ICAP). Since the [DMR-RtC+TMR] protected SAK accelerator uses 5,877,760 configuration bits, the time required to test all of them for SEUs is 2.66 hours via the external fault injection technique vs. 1.69 hours via the ICAP based fault injection method. This includes the additional 1 ms that we run the SAK accelerator for each fault injected, (ii) The setup relies mostly on efficient use of CAD tools without the need for a spare FPGA board, thus providing a lower cost option.

The fault injector is implemented as software on the MicroBlaze soft-core processor. This software issues commands to the HWICAP port (Hardware ICAP) to read frames from the region of the device occupied by the DUT (SAK accelerator), change one bit at a time in each frame, and then write the corrupted frame back to the DUT region in the FPGA. Each time an SEU simulated frame is written back, the SAK accelerator is restarted and its sensitivity to that SEU is measured by comparing the progression of the "current scores" with the progression obtained without any SEUs injected into the DUT. This was made possible because we used the same seed to trigger all the PRNGs, which results in one pattern of current scores' progression. This reference pattern is initially stored in a Memory-of-Scores module by the MicroBlaze via the OPB interconnect. The first occurrence of a change (deviation) in a new progression's pattern from the reference pattern is detected by an Error-Detector module and recorded by the software on the MicroBlaze. At this time, the SAK accelerator is stopped and error message is output to the host computer via the UART. This process is repeated for every configuration bit in the DUT. However if an SEU causes no changes in the progression pattern of current scores, then the SAK accelerator continues to search for a solution to the scheduling problem until a certain cut-off temperature is reached. However, if an SEU affects the execution, of the Adjust Temperature sub-system such that the temperature never decreases, this can cause the DUT to spin in an infinite loop. We avoid this possibility via a watchdog timer.

Testing of all storage elements in the DUT, were carried out in a slightly different manner compared to the process described above. Once the DUT is paused, values of a target memory element are read, corrupted (one bit at a time) and written back into the configuration frame, followed by resumption in the execution of the DUT. Since the DUT is placed inside a partial reconfiguration (PR) region, the placement and routing for the DUT can be retained when moving the DUT to a radiation hardened Virtex 4 part. But the PR region in the new device must be laid out in an area that has the same set and layout of resources, which is possible. This is a concept called partial bitstream relocation, the details of which are beyond the scope of this paper. There are some caveats to the ICAP based testing method: (a) it did not seem, possible to test dock related configuration bits and (b) upsets caused by corruption of certain configuration bits (single event functional interrupt SEFI) can only be restored with a power cycle and not accessed via ICAP. Dealing with SEFIs is also beyond the scope of this paper.

The results from the fault injector on the different levels of protection on the SAK accelerator are presented in Table V. The SAK accelerator was tested in three configurations; no protection, full. TMR, and DMR-RtC+partial-TMR (hybrid technique). The robustness of TMR is shown by the dramatic decrease in sensitivity by a factor of 1800. The hybrid technique areas show a sensitivity level comparable to TMR of less than 0.002%.

Table VI compares the resources taken by the SAK accelerator as well as dynamic power consumed (reported by XPower) when protected by the hybrid technique versus using only TMR. All three versions of the accelerator have post P&R clock frequencies of 155 MHz.

To complete the analysis of the proposed hybrid SEU mitigation technique, it is necessary to estimate the worst-case penalty (time) when scrubbing of frames is necessary for the DMR-RtC components. We use the scrubbing circuit specified in assuming the software in the scrubbing circuit (hosted on a Picoblaze) is updated to be able scrub specific frames on the chip. The worst case penalty to scrub the frames supporting the DMR-RtC protected circuit is 29.56 ms. This was derived by taking the fraction of frames that could affect the DMR-RtC and times that by the time for a complete correction cycle on the LX200 chip.

In this disclosure, we have presented a SAK, a coarse-grained pipeline architecture to accelerate it on an FPGA, and a hybrid SEU mitigation technique to enable it to be ported onto a space qualified pan for autonomous mission planning and scheduling. We compared the execution time of the FPGA based SAK accelerator with a non-parallelized software implementation on a PPC 750 emulator. We also compared the area overheads and SEU sensitivity between using a TMR only approach and the hybrid approach for the SAK accelerator. We also obtained power estimates from Xpower for the two versions, which indicated reasonable power consumptions for a space borne application.

TABLE I

Resource consumption and speed

| | Slice Count | DSP48 Units | BRAM | Latency | Max. Freq. (MHz) |
|---|---|---|---|---|---|
| Main Controller | 160 | 0 | 0 | 3 | 472 |
| Copy Processor | 30 | 0 | 0 | 101 | 289 |
| Alter Processor | 390 | 0 | 0 | 21 | 232 |
| Eval. Processor | 317 | 0 | 5 | 233 | 222 |
| DGVP | 94 | 0 | 1 | 102 | 347 |
| TSLP | 64 | 0 | 0 | 101 | 307 |
| ROP | 164 | 0 | 4 | 232 | 310 |
| Accept Processor | 1,408 | 0 | 1 | 54 | 197 |
| Adjust Temperature Processor | 173 | 5 | 0 | 12 | 444 |

TABLE I-continued

Resource consumption and speed

|  | Slice Count | DSP48 Units | BRAM | Latency | Max. Freq. (MHz) |
|---|---|---|---|---|---|
| Memory | 966 | 0 | 20 | N/A | 912 |
| Complete Processor | 2,831 | 5 | 26 | 235 | 197 |

TABLE II

Comparative Results

| Processing Platform | Clock Freq. | Cycles | Time | Speedup |
|---|---|---|---|---|
| Xilinx Virtex-4 embedded PowerPC core | 100 MHz | $1.51 \times 10^9$ | 15.1 s | 1.0 |
| AMD Athlon 64 | 2.61 GHz | $3.0 \times 10^9$ | 1.15 s | 13.11 |
| Xilinx Virtex-4 iterative repair circuit | 197 MHz | $4.32 \times 10^7$ | 220 ms | 68.64 |

TABLE III

Load/Store Comparison

| | Number of Loads and Stores per function call | | |
|---|---|---|---|
| Function | PowerPC | AMD Athlon | Custom Architecture |
| Copy | 908 | 702 | 200 |
| Alter | 14 | 14 | 2 |
| Evaluate | ~15,000 | ~13,300 | 840 |
| Accept | 60 | 42 | 1 |
| Adjust Temperature | 10 | 5 | 2 |

TABLE IV

Sample cases comparing execution time (in seconds) of the SAK on a PPC750 and Xilinx V4 LX 60 FPGA

| | Events = 100 (edges = 99) | | Events = 80 (edges = 79) | | Events = 60 (edges = 59) | |
|---|---|---|---|---|---|---|
| | Max# CS = 40 | Max# CS = 35 | Max# CS = 35 | Max# CS = 30 | Max# CS = 30 | Max# CS = 25 |
| PPC750 (seconds) | 19.91 | 19.08 | 16.47 | 15.65 | 13.12 | 12.30 |
| FPGA (seconds) | 0.31 | 0.29 | 0.27 | 0.24 | 0.22 | 0.19 |

TABLE V

Sensitivity Results from Testing.

| | No Protection | Full TMR | Hybrid Technique |
|---|---|---|---|
| Num. Bits Tested | 4,400,448 | 8,732,672 | 5,877,760 |
| Num. Sensitive Bits and FFs | 126,191 | 68 | 93 |
| % Sensitive Bits | 2.87 | 0.0008 | 0.0016 |

TABLE VI

Comparison of Area and Power between TMR, Hybrid and Unprotected versions of the SAK accelerator.

| | Area | | | Dynamic Power |
|---|---|---|---|---|
| | LUTS | FFs | DSPs | (mW) |
| TMR only | 9431 | 9132 | 15 | 344 |
| Hybrid technique | 8224 | 6976 | 10 | 323 |
| No protection | 3070 | 3046 | 5 | 145 |

What is claimed is:

1. A system for pipelined simulated annealing on Field Programmable Gate Array (FPGA) comprising:
   a Memory Multiplexer comprising FPGA gates;
   a Main controller comprising FPGA gates and communicatively coupled to said Memory Multiplexer;
   at least five Memory modules communicatively coupled to said Memory Multiplexer, each Memory module comprising a FPGA Random Access Memory (RAM) block and storing a solution and a solution score of the solution, each solution comprising a plurality of events, a first Memory module storing a current solution and a current solution score;
   a Copy processor comprising FPGA gates and communicatively coupled to said Memory Multiplexer and to said Main controller, and copying the current solution to a second Memory module;
   an Alter processor comprising FPGA gates, communicatively coupled to said Memory Multiplexer and to said Main controller, and processing the current solution in the second Memory module to generate a next solution;
   an Evaluate processor comprising FPGA gates, communicatively coupled to said Memory Multiplexer and to said Main controller, and computing a next solution score for the next solution stored in the second Memory module;
   an Accept processor comprising FPGA gates, communicatively coupled to said Memory Multiplexer and to said Main controller, and processing the next solution stored in the second Memory module with an annealing calculation;
   an Adjust Temperature processor comprising FPGA gates, communicatively coupled to said Accept processor and to said Main controller, and adjusting a temperature of the annealing calculation;
   wherein the Copy processor iteratively copies the current solution from the first Memory module to a third, a fourth, and a fifth Memory module subsequent to copying the current solution to the second Memory module, and the Alter processor, the Evaluate processor, the Accept processor, and the Adjust Temperature processor each iteratively processing the solution stored in the third, the fourth, and the fifth Memory modules such that the solution stored in the third, the fourth, and the fifth Memory modules are processed concurrently with the solution stored in the second Memory module.

2. The system of claim 1 wherein:
   at least one said Memory module retains a copy of a best computed solution score and solution.

3. The system of claim 2 further comprising:
   iterating modification of system parameters and computing the next solution until a predetermined performance goal is obtained.

4. The system of claim 1, the Alter processor further randomly selecting an event of the current solution in the second Memory module, modifying the randomly selected event to generate the next solution, and storing the next solution in the second Memory module.

5. The system of claim 4, the Accept processor further computing a probability of the next solution stored in the second Memory module being better than the current solution stored in the first Memory module using the next solution score, the current solution score, and the temperature, copying the next solution to the first Memory module as the current solution if the next solution score is better than the current solution score, else copying the next solution to the first Memory module as the current solution if the probability is greater than a random number.

6. The system of claim 5, the Adjust Temperature processor further adjusting the temperature by multiplying the temperature by a cooling value.

7. A method for pipelined simulated annealing on a Field Programmable Gate Array (FPGA) comprising:
   storing, using FPGA gates, a current solution and a current solution score in a first Memory module of at least five Memory modules communicatively coupled to a Memory Multiplexer comprising FPGA gates and to a Main controller comprising FPGA gates and communicatively coupled to said Memory Multiplexer, each Memory module comprising a FPGA Random Access Memory (RAM) block and storing a solution and a solution score of the solution, each solution comprising a plurality of events;
   copying, using a Copy processor comprising FPGA gates and communicatively coupled to said Memory Multiplexer and to said Main controller, the current solution to a second Memory module;
   processing, using an Alter processor comprising FPGA gates and communicatively coupled to said Memory Multiplexer and to said Main controller, the current solution in the second Memory module to generate a next solution;
   computing, using an Evaluate processor comprising FPGA gates and communicatively coupled to said Memory Multiplexer and to said Main controller, a next solution score for the next solution stored in the second Memory module;
   processing, using an Accept processor comprising FPGA gates and communicatively coupled to said Memory Multiplexer and to said Main controller, the next solution stored in the second Memory module with an annealing calculation;
   adjusting, using an Adjust Temperature processor comprising FPGA gates and communicatively coupled to said Memory Multiplexer and to said Main controller, a temperature of the annealing calculation;
   iteratively copying, using said Copy processor, the current solution from the first Memory module to a third, a fourth, and a fifth Memory module subsequent to copying the current solution to the second Memory module;
   iteratively processing, using said Alter processor, said Evaluate processor, said Accept processor, and said Adjust Temperature processor, the solution stored in the third, the fourth, and the fifth Memory modules such that the solution stored in the third, the fourth, and the fifth Memory modules are processed concurrently with the solution stored in the second Memory module.

8. The method of claim 7, further comprising said Alter processor randomly selecting an event of the current solution in the second Memory module, modifying the randomly selected event to generate the next solution, and storing the next solution in the second Memory module.

9. The method of claim 8, further comprising said Accept processor computing a probability of the next solution stored in the second Memory module being better than the current solution stored in the first Memory module using the next solution score, the current solution score, and a temperature, copying the next solution to the first Memory module as the current solution if the next solution score is better than the current solution score, else copying the next solution to the first Memory module as the current solution if the probability is greater than a random number.

10. The method of claim 9, further comprising said Adjust Temperature processor adjusting the temperature by multiplying the temperature by a cooling value.

* * * * *